United States Patent
Nam et al.

(10) Patent No.: US 12,177,144 B2
(45) Date of Patent: Dec. 24, 2024

(54) CHANNEL REPORTING FOR RECONFIGURABLE SURFACES

(71) Applicant: QUALCOMM Incorporated, San Diego, CA (US)

(72) Inventors: Wooseok Nam, San Diego, CA (US); Yucheng Dai, San Diego, CA (US); Tao Luo, San Diego, CA (US); Peter Gaal, San Diego, CA (US); Sony Akkarakaran, Poway, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/362,613

(22) Filed: Jun. 29, 2021

(65) Prior Publication Data
US 2022/0416968 A1 Dec. 29, 2022

(51) Int. Cl.
*H04L 5/00* (2006.01)
*H04L 27/26* (2006.01)
(Continued)

(52) U.S. Cl.
CPC ...... *H04L 5/0048* (2013.01); *H04L 27/26132* (2021.01); *H04W 72/54* (2023.01); *H04W 76/10* (2018.02)

(58) Field of Classification Search
CPC .......... H04L 5/0048; H04L 27/26132; H04W 72/1226; H04W 76/10
(Continued)

(56) References Cited

U.S. PATENT DOCUMENTS

| 11,528,657 B1* | 12/2022 | Mangalvedhe | ....... H04W 16/28 |
| 2014/0162655 A1* | 6/2014 | Hong | ...................... H01Q 21/26 |
| | | | 343/893 |

(Continued)

FOREIGN PATENT DOCUMENTS

| WO | 2020029200 A1 | 2/2020 |
| WO | WO-2022186815 A1 * | 9/2022 ............. H01Q 1/241 |

OTHER PUBLICATIONS

International Search Report and Written Opinion—PCT/US2022/034732—ISA/EPO—Mar. 1, 2023.
(Continued)

*Primary Examiner* — Xuan Lu
(74) *Attorney, Agent, or Firm* — Holland & Hart LLP

(57) ABSTRACT

Methods, systems, and devices for wireless communications are described. Repetitions of a reference signal may be transmitted by a first device. In some examples, the repetitions may be quasi-colocated with one another, share an antenna port, or both. The repetitions of the reference signal may arrive at a reconfigurable surface. The reconfigurable surface may apply a modulation sequence to the repetitions of the reference signal and output modulated repetitions of the reference signal in a direction based on a reflective state of the reconfigurable surface. A signal including the modulated repetitions of the reference signal may be received by a second device and combined with the modulation sequence used by the reconfigurable surface to obtain a combined signal. The combined signal may be used to determine, for the reconfigurable surface, information about a channel between the first device and the second device.

19 Claims, 20 Drawing Sheets

(51) Int. Cl.
*H04W 72/54* (2023.01)
*H04W 76/10* (2018.01)

(58) Field of Classification Search
USPC .......................................................... 370/329
See application file for complete search history.

(56) References Cited

U.S. PATENT DOCUMENTS

| | | | |
|---|---|---|---|
| 2019/0305830 A1 | 10/2019 | Zhou et al. | |
| 2020/0015214 A1* | 1/2020 | Si | H04W 76/14 |
| 2020/0146070 A1* | 5/2020 | Xiong | H04W 74/0833 |
| 2021/0176670 A1* | 6/2021 | Keskitalo | H04W 76/10 |
| 2022/0174509 A1* | 6/2022 | Noh | H04W 72/51 |
| 2022/0232396 A1* | 7/2022 | Cavcic | H04W 16/26 |
| 2022/0407222 A1* | 12/2022 | Zhu | H04W 24/10 |
| 2023/0176174 A1* | 6/2023 | Penna | G01S 5/02521 |
| | | | 342/451 |
| 2023/0258759 A1* | 8/2023 | Wang | G01S 5/0273 |
| | | | 455/456.1 |

OTHER PUBLICATIONS

Jung M., et al., "Asymptotic Optimality of Reconfigurable Intelligent Surfaces: Passive Beamforming and Achievable Rate", ICC 2020—2020 IEEE International Conference on Communications (ICC), IEEE, Jun. 7, 2020, 6 Pages, XP033797656, DOI: 10.1109/ICC40277.2020.9148640, Section II, Figure 1, Subsection III B.

Jung M., et al., "On the Optimality of Reconfigurable Intelligent Surfaces (RISs): Passive Beamforming, Modulation, and Resource Allocation", arxiv.org, Cornell University Library, 201 Olin Library Cornell University Ithaca, NY 14853, Oct. 2, 2019, pp. 1-33, XP081502033, Feb. 4, 2021, Figure 3, Subsection II B.

Jung M., et al., "On the Optimality of Reconfigurable Intelligent Surfaces (RISs): Passive Beamforming, Modulation, and Resource Allocation", IEEE Transactions on Wireless Communications, IEEE Service Center, Piscataway, NJ, US, vol. 20, No. 7, Feb. 18, 2021, pp. 4347-4363, XP011865418, 16 Pages, ISSN: 1536-1276, DOI: 10.1109/TWC.2021.3058366, Subsection IB, Subsection III B, Figure 1.

* cited by examiner

CHANNEL REPORTING FOR RECONFIGURABLE SURFACES

FIELD OF TECHNOLOGY

The following relates to wireless communications, including channel reporting for reconfigurable surfaces.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support channel reporting for reconfigurable surfaces. Repetitions of a reference signal may be transmitted by a first device. In some examples, the repetitions may be quasi-colocated with one another, share an antenna port, or both. The repetitions of the reference signal may arrive at a reconfigurable surface. The reconfigurable surface may apply a modulation sequence to the obtained repetitions of the reference signal and output modulated repetitions of the reference signal in a direction based on a reflective state of the reconfigurable surface. A signal including the modulated repetitions of the reference signal may be received by a second device and combined with the modulation sequence used by the reconfigurable surface to obtain a combined signal. The combined signal may be used to determine, for the reconfigurable surface, information about a channel between the first device and the second device.

DETAILED DESCRIPTION

Figure 1:
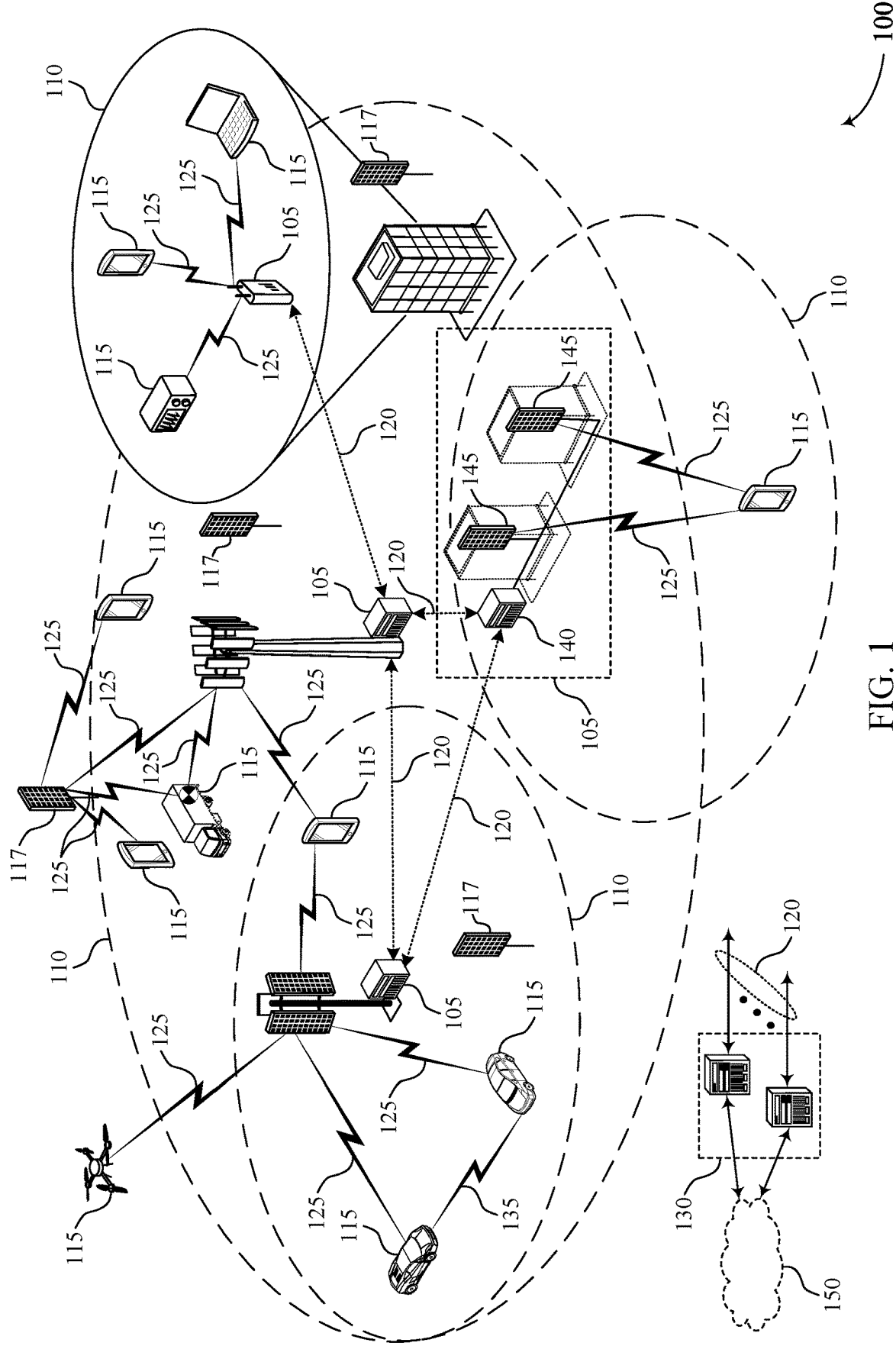
FIG. 1 illustrates an example of a wireless communications system that supports channel reporting for reconfigurable surfaces in accordance with aspects of the present disclosure.

Communication devices in a wireless communications system may communicate with one another using beamformed signals. In some examples, a transmitting device forms multiple beams (where each beam may be associated with an index) and transmits a beamformed signal to a receiving device over one of the multiple beams. In some cases, the receiving device indicates, to the transmitting device, a preferred beam of the multiple beams for communicating with the transmitting device. A wireless communications system may also include reconfigurable surfaces. Reconfigurable surfaces may be used to reflect beamformed signals in a desired direction. In some examples, a reconfigurable surface may be configured to have different angles of reflection—e.g., based on a position of a transmitting device relative to a receiving device. In some examples, a subset of the beams formed by the transmitting device include beams reflected by a reconfigurable surface with different angles of reflection. These beams may include a first, direct portion between the transmitting device and reconfigurable surface that is common to the beams and a second, reflected portion between the reconfigurable surface and a communications device that is modified for the different beams.

In some examples, a receiving device may indicate a beam that is reflected by a reconfigurable surface as being preferred. But a transmitting device may be unable to determine whether the receiving device is in a direct path of the preferred beam (before the reconfigurable surface) or an indirect path of the preferred beam (after the reconfigurable surface)—e.g., because the receiving device may solely indicate the index of the preferred beam. Accordingly, the transmitting device may assume that the receiving device is in the indirect path of the preferred beam and control the reconfigurable surface to form the preferred beam. However, if the receiving device is actually in the direct path of the preferred beam, the reconfigurable surface may be unnecessarily provisioned—e.g., increasing signaling overhead and unnecessarily limiting the availability of the reconfigurable surface. Also, reflections from the reconfigurable surface may cause interference to other devices in a radio access network.

To increase a utilization of reconfigurable surfaces and prevent interference to other devices, techniques for determining whether to use a reconfigurable surface to communicate with a receiving device (e.g., a UE) may be used. In some examples, to enable a transmitting device (e.g., a base station) to determine whether to use a reconfigurable surface, a receiving device may report channel information including sets of channel information that are specific to respective reconfigurable surfaces of a set of reconfigurable surfaces. To enable reporting channel information specific to respective reconfigurable surfaces, repetitions of a reference signal (e.g., a CSI-RS) may be transmitted, and reconfigurable surfaces that obtain (e.g., receive or detect) the repetitions of the reference signal may apply a unique modulation sequence to the repetitions of the reference signal. Accordingly, a receiving device may receive a signal corresponding to the repetitions of the reference signal that includes direct path and reflected path components and may distinguish repetitions of the reference signal received via a direct path from repetitions of the reference signal received via one or more reconfigurable surfaces. The receiving device may separately process the received versions of the repetitions of the reference signals to determine channel information about a direct path and one or more indirect paths from one or more reconfigurable surfaces.

By generating specific channel information for reconfigurable surfaces, a transmitting device may determine whether to use a reconfigurable surface when transmitting to a device using a beam that is associated with the reconfigurable surface. Accordingly, the unnecessary configuration of reconfigurable surfaces and the reconfigurable surfaces may remain available to improve transmissions by other devices, increasing a throughput of the radio access network. Also, interference caused by unnecessarily configured reconfigurable surfaces may be decreased, increasing a reliability and throughput of the radio access network.

Aspects of the disclosure are initially described in the context of wireless communications systems. Aspects of the disclosure are initially described in the context of resource diagrams and composite signal. Aspects of the disclosure are further illustrated by and described with reference to apparatus diagrams, system diagrams, and flowcharts that relate to channel reporting for reconfigurable surfaces.

FIG. 1 illustrates an example of a wireless communications system 100 that supports discovery of reconfigurable surfaces in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A base station 105 may form beams in multiple directions originating from the base station 105. In some examples, a beam may be selected for communications between a base station 105 and a UE 115—e.g., a beam originating from the base station 105 that points in a direction of the UE 115. In such cases, an energy of beamformed transmissions from a base station 105 using the beam may be focused in a direction of the beam. In some examples, each beam is associated with a different index—e.g., a first beam is associated with a first index, a second beam is associated with a second index, and so on. In some examples, during a beam management operation, a UE 115 indicates to a base station 105 a preferred beam for communicating with the base station 105—e.g., by indicating an index of a reference signal (e.g., a CSI-RS) associated with the beam in a CSI report.

Based on using beamformed transmissions and, in some examples, higher frequencies for wireless communications, an effect of objects positioned between a base station 105 and UE 115 (which may be referred to as blockages) on communications between the base station 105 and UE 115 may be increased. Accordingly, in some examples, an increased quantity of base station 105 may be deployed in a radio access network to ensure reliable coverage across a geographic region.

In some examples, to reduce the quantity of deployed base stations 105, reconfigurable surfaces 117 may be deployed in the radio access network instead of base stations 105. The reconfigurable surfaces 117 may be used to reflect signals received from a base station 105—e.g. toward an intended receiving device. A reconfigurable surface 117 may be composed of uniformly distributed electrically controllable elements—e.g., transmissions lines whose characteristics can be changed by varying a capacitance of the transmission lines. Each element of a reconfigurable surface 117 may have reconfigurable electromagnetics characteristics (e.g., a reflection coefficient). Based on the combination of configured states of the elements, a reconfigurable surface 117 can reflect and modify incident radio waveforms in a controlled manner—e.g., changing reflected direction, beam width, etc. Accordingly, a reconfigurable surface 117 may be deployed in a radio access network to alter the channel realization of the radio network in a controlled manner, increasing channel diversities and providing robustness to channel blocking/fading.

In some examples, a reconfigurable surface 117 is a reconfigurable intelligent surface (RIS), a repeater (e.g., a smart repeater), or the like. An MS may be a passive device that can be configured to have a desired angle of reflection and a repeater may be an active device that can be configured to provide a desired angle of reflection. An RIS may include passive components that change characteristics as waveforms propagate through or come into contact with the passive components (e.g., electronically controllable waveguides, electronically controllable transmission lines, adjustable reflectors, etc.). A repeater may include active components that modify received signals and retransmits the modified received signals. A reconfigurable surface 117 that uses passive components to modify received signals may use less energy than a reconfigurable surface 117 that uses active components to modify received signals. In some examples, an RIS includes an array of reflective elements (e.g., controllable transmission lines).

A base station 105 may use a reconfigurable surface 117 to transmit a signal to a UE 115 via an indirect path (e.g., if a direct path to the UE 115 is blocked). That is, based on an angle of reflection configured at the RIS and a position of a UE 115 relative to the RIS, the base station 105 may transmit a signal to the RIS such that a reflection of the signal (e.g., based on an angle of incidence of the signal) travels toward the UE 115. In some examples, the base station 105 controls an angle of reflection configured at a reconfigurable surface 117—e.g., by sending a message including a configuration for the reconfigurable surface 117. In some examples, a discrete quantity of angles of arrival may be configured for a reconfigurable surface 117, where each angle of arrival may be associated with a reflective state of the reconfigurable surface 117. In other examples, a reconfigurable surface 117 may configure different angles of arrival in accordance with a preconfigured or scheduled pattern—that is, the reconfigurable surface 117 may cycle between different reflective states.

In some examples, a base station 105 uses a reconfigurable surface 117 to form multiple beams, where each beam may be associated with a beam index. In some examples, the beams of the multiple beams may include first portions (e.g., transmission beams) between the base station 105 and reconfigurable surface 117 that is completely or partially overlapping. The beams may also include second portions (e.g., reflection beams) between the reconfigurable surface 117 and a UE 115 that are angularly distributed based on corresponding angles of reflection being configured at the reconfigurable surface 117. In some examples, the beams form an indirect path to a UE 115 via the reconfigurable surface 117. In other examples, the first portion of the beams form a direct path to a UE 115 (e.g., positioned in front of the reconfigurable surface).

In some examples, the UE 115 may indicate a beam that is reflected by a reconfigurable surface 117 as being preferred. But a base station 105 may be unable to determine whether the UE 115 is in a direct path of the preferred beam (before the reconfigurable surface 117) or an indirect path of the preferred beam (after the reconfigurable surface 117)—e.g., because the UE 115 may solely indicate the index of the preferred beam. Accordingly, the base station 105 may assume (conservatively) that the UE 115 is in the indirect path of the preferred beam and control the reconfigurable surface 117 to form the preferred beam. However, if the UE 115 is actually in the direct path of the preferred beam, the reconfigurable surface 117 may be unnecessarily provisioned—e.g., increasing signaling overhead and unnecessarily limiting the availability of the reconfigurable surface 117. Also, reflections from the reconfigurable surface 117 may cause interference to other devices in a radio access network.

To increase a utilization of reconfigurable surfaces 117 and prevent interference to other devices, techniques for determining whether to use a reconfigurable surface 117 to communicate with a receiving device (e.g., a UE 115) when using a beam that is associated with the reconfigurable surface 117 may be used. In some examples, to enable a transmitting device (e.g., a base station 105) to determine whether to use a reconfigurable surface 117, a receiving device may report channel information including sets of channel information that are specific to respective reconfigurable surfaces 117 of a set of reconfigurable surfaces 117. To enable reporting channel information specific to respective reconfigurable surfaces 117, repetitions of a reference signal (e.g., a CSI-RS) may be transmitted, and reconfigurable surfaces 117 that receive the repetitions of the reference signal may apply a unique modulation sequence to the repetitions of the reference signal. Accordingly, a receiving device may receive a signal corresponding to the repetitions of the reference signal that includes direct path and reflected path components and may distinguish repetitions of the reference signal received via a direct path from repetitions of the reference signal received via one or more reconfigurable surfaces 117. The receiving device may separately process the received versions of the repetitions of the reference signals to determine channel information about a direct path and one or more indirect paths from one or more reconfigurable surfaces.

Figure 2A:
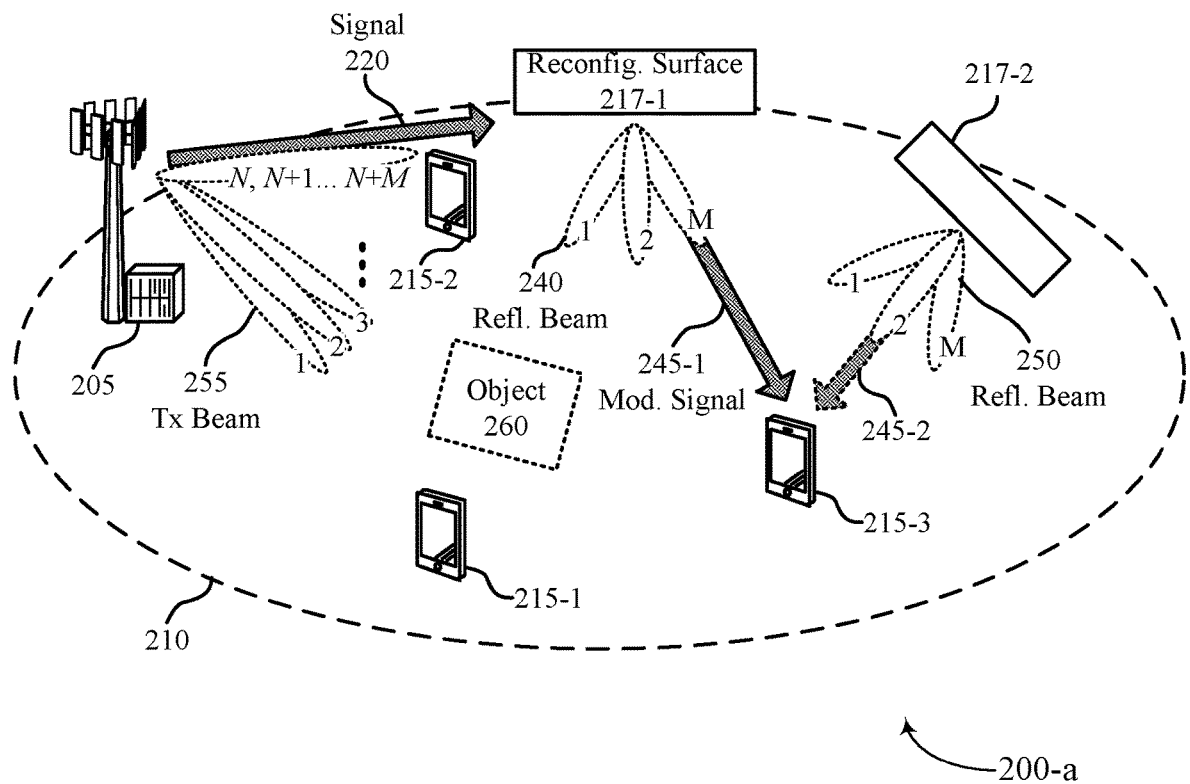
FIGS. 2A and 2B illustrate examples of wireless communications subsystems that support channel reporting for reconfigurable surfaces in accordance with aspects of the present disclosure.

FIG. 2A illustrates an example of a wireless communications subsystem that supports channel reporting for reconfigurable surfaces in accordance with aspects of the present disclosure.

Wireless communications subsystem 200-a includes base station 205, first UE 215-1, second UE 215-2, third UE 215-3, first reconfigurable surface 217-1, and second reconfigurable surface 217-2, which may be respective examples of a base station, UE, or reconfigurable surface described with reference to FIG. 1. Base station 205 and UEs 215 may communicate with one another (e.g., via reconfigurable surfaces 217) within coverage area 210 using one or more of the techniques described in FIG. 1. First UE 215-1 may be in a first region of coverage area 210, second UE 215-2 may be in a second region of coverage area 210, and third UE 215-3 may be in a third region of coverage area 210. Wireless communications subsystem 200-a may depict the transmission of reference signal repetitions to a UE.

In some examples, objects, such as object 260, may be positioned between base station 205 and a UE and may be referred to as blockages. Object 260 may be a building, a large vehicle, a structure, or the like. As described herein, base station 205 may use reconfigurable surfaces to transmit signal around objects, such as object 260.

Base station 205 may form multiple transmission beams 255 (e.g., (N+M) transmission beams) to communicate with UEs positioned in different regions of coverage area 210. In some examples, a subset of the transmission beams 255 (e.g., transmissions beams with the indices N, N+1 . . . N+M) may be pointed in a same direction (e.g., towards first reconfigurable surface 217-1). Each transmission beam 255 of the subset of the transmission beams 255 may be associated with a respective reflective state and reflection beam of a reconfigurable surface. For example, Nth transmission beam 255 may correspond to a first reflective state and first reflection beam 240-1 of first reconfigurable surface 217-1, (N+1)th transmission beam 255 may correspond to a second reflective state and second reflection beam 240-2 of first reconfigurable surface 217-1, and so on.

In some examples, base station 105 may use first transmission beam 255 to communicate with first UE 215-1. Base station 105 may use (N+M)th transmission beam 255 to communicate with second UE 215-2. Base station 105 may also use (N+M)th transmission beam 255 and Mth reflection beam 240-M to communicate with third UE 215-3.

As described herein, UEs 215 may report channel information (e.g., in a CSI report) for signals received from base station 205. In some examples, the channel information includes an indication of a beam preferred by a UE 215 to communicate with base station 205. As also described herein, for beams that are directed toward a reconfigurable surface, base station 205 may be unable to determine if a UE that reports one of the beams as a preferred beam is positioned before the reconfigurable surface (e.g., in a direct path) or after the reconfigurable surface (e.g., in an indirect path). For example, second UE 215-2 and third UE 215-3 may both indicate a preference for the (N+M)th transmission beam, and without additional information, base station 205 may be unable to determine that second UE 215-2 is positioned before first reconfigurable surface 217-1 while third UE 215-3 is positioned after first reconfigurable surface 217-1.

As also described herein, techniques may be used to enable base station 205 to determine whether a UE 215 that reports a preference for a beam pointed toward a reconfigurable surface (such as (N+M)th transmission beam 255) is using the reconfigurable surface to receive signals over the beam. For example, the UEs 215 may transmit CSI reports that include separate CSI for a direct path and one or more indirect paths associated with neighboring reconfigurable surfaces. Also, to enable the generation of such CSI reports, base station 205 may transmit repetitions of a reference signal (e.g., CSI-RS references signals), where each reconfigurable surface 217 may apply a unique modulation to the repetitions of the reference signal.

In some examples, base station 205 establishes connections with UEs 215—e.g., using reconfigurable surfaces. Based on establishing the connections, base station 205 may transmit signal 220 in a direction of first reconfigurable surface 217-1 using the (N+M)th transmission beam 255. Signal 220 may include a repetition of reference signals. In some examples, signal 220 may include K repetitions of a set of CSI-RSs that are transmitted over K repetitions of a set of CSI-RS resources. In some examples, corresponding CSI-RS resources in the repetitions of the set of CSI-RS resources may be quasi-colocated with one another. In some examples, corresponding CSI-RS resources in the repetitions of the set of CSI-RS resources may be associated with a same antenna port. Configurations of signal 220 are described in more detail herein and with reference to FIG. 3.

Second UE 215-2 may receive signal 220 via a direct path between base station 205 and second UE 215-2. Signal 220 may arrive at first reconfigurable surface 217-1 via a direct path between base station 205 and first reconfigurable surface 217-1. In some examples, first reconfigurable surface may obtain (e.g., receive or detect using passive or active means) signal 220. Based on signal 220 arriving at first reconfigurable surface 220, first reconfigurable surface 217-1 may output (e.g., reflect or transmit) first modulated signal 245-1. First modulated signal 245-1 may include modulated versions of the repetitions of the reference signals in signal 220. In some examples, second reconfigurable surface 217-2 also obtains a version of signal 220 via a direct or indirect path and applies a modulation sequence to the received signal, as similarly described with reference to first reconfigurable surface 217-1.

Before outputting first modulated signal, first reconfigurable surface 217-1 may apply a modulation sequence to a version of signal 220 that arrives at first reconfigurable surface 217-1. Applying the modulation sequence may include applying a modulation of the modulation sequence to each repetition of the reference signals included in signal 220. In some examples, the modulation sequence includes a series of phase modulations, amplitude modulations (e.g., on/off keying), spatial modulation, or polarizations. The modulation sequence may be unique to first reconfigurable surface 217-1 (as compared to modulation sequences assigned to other reconfigurable surfaces). In some examples, the modulation sequence may also be indicative of a reflective state currently configured at first reconfigurable surface 217-1. To support modulation sequences that indicate reflective states, each reconfigurable surface may be assigned a unique set of modulation sequences, where, in some examples, the first modulation sequence of a set of modulation sequences corresponds to a first reflective state, the second modulation sequence corresponds to a next reflective state, and so on. In some examples, base station 205 assigns and broadcasts the unique modulation sequences (or unique sets of modulation sequences) to reconfigurable surfaces e.g., in a broadcast message.

For example, first reconfigurable surface 217-1 and second reconfigurable surface 217-2 may each be assigned respective sets of modulation sequences, where each modulation sequence may be associated with different reflective states (which correspond to different angles of reflection. In some examples, the initial modulation sequence in a set of modulation sequences may correspond to an initial angle of reflection (e.g., 15 degrees), the next modulation sequence may correspond to a next angle of reflection (e.g., 30 degrees), a following modulation sequence may correspond to a following angle of reflection (e.g., 45 degrees), and so on. In such examples, first reconfigurable surface 217-1 may apply a modulation sequence to the received version of sensing signal 230-*a* that is both unique to first reconfigurable surface 217-1 and indicative of a reflective state configured at first reconfigurable surface 217-1 before transmitting first modulated signal 225-*a*-1. Second reconfigurable surface 217-2 may also apply a modulation sequence to the received version of sensing signal 230-*a* that is both unique to second reconfigurable surface 217-2 and indicative of a reflective state configured at second reconfigurable surface 217-2 before transmitting second modulated signal 225-*a*-2.

Third UE 215-3 may receive a composite signal having multiple components including a component associated with first modulated signal 245-1 output by first reconfigurable surface 217-1. The composite signal may also include a component associated with a direct path between base station 205 and third UE 215-3. In some examples, the composite signal also includes a component associated with second modulated signal 245-2 output by second reconfigurable surface 217-2. Accordingly, third UE 215-3 may receive signal 220 from base station 205 via a direct path and one or more indirect paths.

Figure 4:
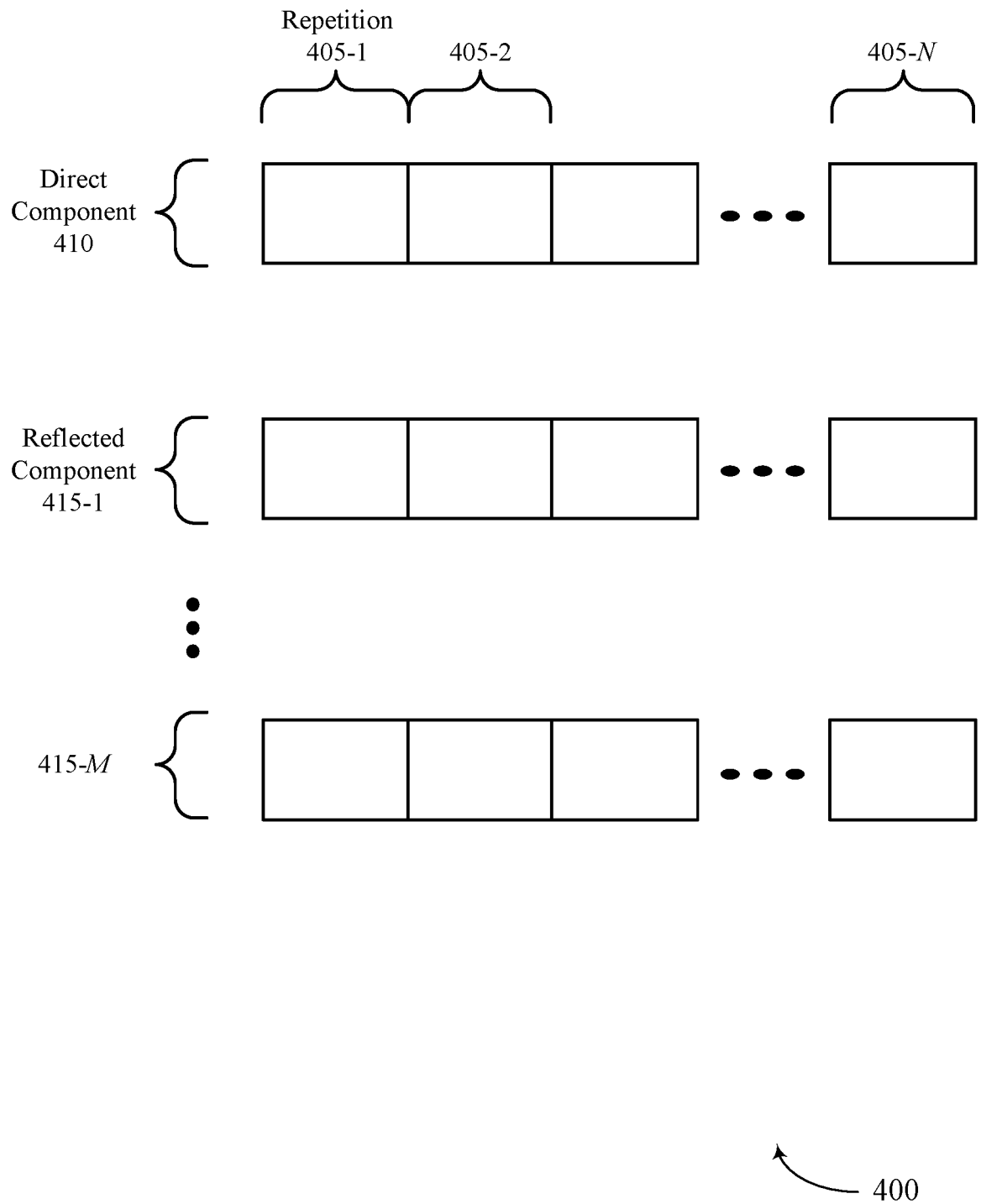
FIG. 4 illustrates an example of a composite signal associated with channel reporting for reconfigurable surfaces in accordance with aspects of the present disclosure.

Based on receiving composite signal, third UE 215-3 may combine portions of the composite signal corresponding to the repetitions of the reference signals with one or more modulation sequences assigned to one or more reconfigurable surfaces, as described in more detail herein and with reference to FIG. 4. In some examples, third UE 215-3 combines the portions of the composite signal with the modulation sequence assigned to first reconfigurable surface. In some examples, the combining weights are derived from a signature (e.g., the modulation pattern) detected for the reconfigurable surfaces. In other examples, the combining weights are received from base station 205—e.g., in control messaging including a CSI report configuration.

Based on the combining, third UE 215-3 may obtain a combined signal that emphasizes the modulated repetitions of the reference signal—e.g., by suppressing other components of the composite signal. Accordingly, third UE 215-3 may determine metrics of the combined signal that are associated with first reconfigurable surface 217-1 and the beam used to transmit signal 220. The metrics of the combined signal may include RSRP, SNR, SINR, delay spread, Doppler spread, etc. Also, third UE 215-3 may determine transmission parameters for the beam when using first reconfigurable surface 217-1, including a modulation and coding scheme (e.g., based on a determined channel quality indicator (CQI)), a precoding matrix, and a rank.

In some examples, third UE 215-3 may similarly obtain a combined signal associated with second reconfigurable surface 217-2 by combining the composite signal with the modulation sequence assigned to second reconfigurable surface 217-2, determine metrics of the combined signal associated with second reconfigurable surface 217-2, and determine transmission parameters for the beam when using second reconfigurable surface 217-2. Additionally, third UE 215-3 may obtain a signal component associated with the direct path between base station 205 and third UE 215-3—e.g., based on the combined signals generated for the reconfigurable surfaces. Third UE 215-3 may similarly determine metrics of the combined signal associated with the direct path and determine transmission parameters for the beam when using the direct path.

Second UE 215-2 may similarly determine channel information and transmission parameters associated with a direct path and one or more indirect paths between second UE 215-2 and base station 205 via one or more reconfigurable surfaces. In some examples, the energy of the components associated with the reconfigurable surfaces in the composite signal received at second UE 215-2 is reduced relative to the composite signal received at third UE 215-3—e.g., based on the relative positions of second UE 215-2 and third UE 215-3. First UE 215-1 may also similarly determine channel information and transmission parameters associated with a direct path and one or more indirect paths between first UE 215-1 and base station 205 via one or more reconfigurable surfaces. In some examples, the energy of the components associated with the reconfigurable surfaces in the composite signal received at second UE 215-1 is reduced relative to the composite signal received at third UE 215-3 and the composite signal received at second UE 215-2.

Figure 2B:
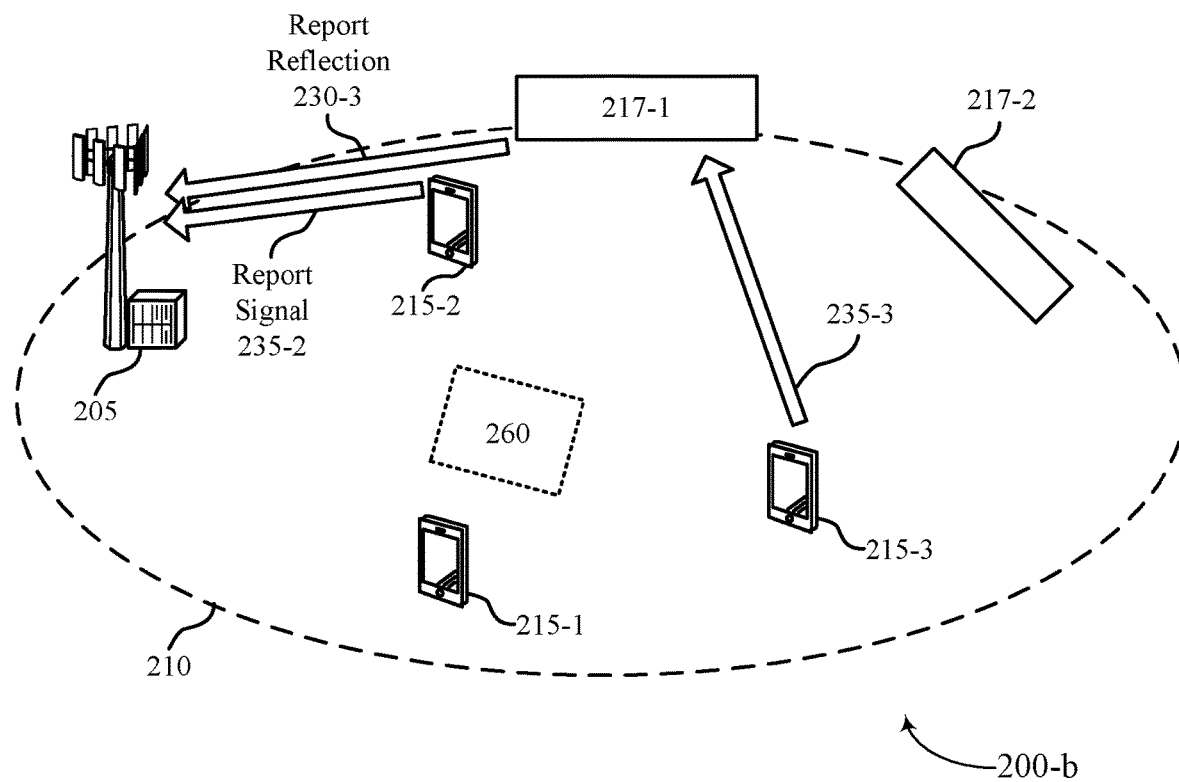

FIG. 2B illustrates an example of a wireless communications subsystem that supports channel reporting for reconfigurable surfaces in accordance with aspects of the present disclosure.

Wireless communications subsystem 200-*b* includes base station 205, first UE 215-1, second UE 215-2, third UE 215-3, first reconfigurable surface 217-1, and second reconfigurable surface 217-2, which may be respective examples of a base station, UE, or reconfigurable surface described with reference to FIG. 1. Wireless communications subsystem 200-*b* may depict the reporting of direct path and per-MS channel information to a base station.

Based on determining the channel information and transmission parameters, second UE 215-2 and third UE 215-3 may generate CSI reports to indicate the channel conditions, transmission parameters, or both to base station. The CSI reports may contain a Layer 1-reference signal receive power (L1-RSRP), Layer 1-signal-to-interference-to-noise ratio (L1-SINR), CQI, precoding matrix indicator (PMI), rank indicator (RI), CSI-reference signal resource indicator (CRI), etc. In some examples, the CSI reports may include channel information for multiple beams (e.g., for multiple CRIs). In some examples, the CSI reports may include an MS index, a modulation sequence index associated with an RIS, or both e.g., if a CSI report is for a channel of a reconfigurable surface. Also, the CSI reports may include a first set of channel information for a direct path, one or more sets of channel information for one or more reconfigurable surfaces, or both. In some examples, the CSI report includes one or more sets of channel information and excludes channel information for a direct path—e.g., if the direct path is blocked, not worth reporting (based on signal metrics being below a threshold, for example), CSI reporting configuration indicates that channel information for the direct path is not to be transmitted.

In some examples, third UE 215-3 generates a CSI report including a first set of channel information for a direct path between base station 205 and third UE 215-3 and a second set of channel information for an indirect path between base station 205 and third UE 215-3 via first reconfigurable surface 217-1. In some examples, the CSI report is generated to also include a third set of channel information for an indirect path between base station 205 and third UE 215-3 via second reconfigurable surface 217-2. Second UE 215-2 may similarly generate a CSI report including a set of channel information for a direct path between base station 205 and second UE 215-2 and one or more sets of channel information for one or more indirect paths between base station 205 and second UE 215-2 via one or more reconfigurable surfaces 217.

Based on generating a CSI report, third UE 215-3 may transmit third report signal 235-3 including the CSI report to base station 205 via first reconfigurable surface 217-1. First reconfigurable surface 217-1 may reflect third report signal 235-3 toward base station 205 as third report reflection 230-3 including the CSI report. Also based on generating a CSI report, second UE 215-2 may transmit second report signal 235-2 to base station 205, directly.

Base station 205 may receive the CSI reports from second UE 215-2 and third UE 215-3. For example, base station 205 may receive a first CSI report from third UE 215-3. Based on the first CSI report, base station 205 may determine channel information associated with a direct path to third UE 215-3 using the different transmission beams 255, channel information associated with an indirect path to third UE 215-3 via first reconfigurable surface 217-1 using the different transmission beams 255, and (in some examples) channel information associated with an indirect path to third UE 215-3 via second reconfigurable surface 217-2 using the different transmission beams 255. Based on this information, base station 205 may determine whether to serve third UE 215-3 over a direct link or an indirect link—e.g., base station 205 may select the indirect link through first reconfigurable surface 217-1. Base station 205 may also determine a beam to use for the selected link—e.g., base station 205 may select the (N+M)th transmission beam 255 associated with Mth reflection beam 240-M of first reconfigurable surface 217-1. Additionally, base station 205 may determine transmission parameters (e.g., a modulation and coding scheme, precoding matrix, and rank indicator) for each of the links and beams—e.g., based on received CQIs, PMIs and RIs.

In some examples, an alternative technique may be used to determine a position of a UE that is not configured to combine a received signal with modulation sequences of reconfigurable surfaces. In some examples, base station 205 may configure multiple (e.g., two) reference signal resources (e.g., CSI-RS resources) for one or more UEs (e.g., second UE 215-2 or third UE 215-3). In some examples, base station 205 schedules a single reference signal resource set that includes two reference signal resources for the one or more UEs—the reference signal resources may be associated with different beams. In other examples, base station 205 schedules two reference signal resource sets each including a single reference signal resource.

Base station 205 may use the reference signal resources to transmit reference signals toward first reconfigurable surface 217-1. Based on the reference signals being transmitted, first reconfigurable surface 217-1 may apply an "on" reflection to the first reference signal received in the first resource (that is, first reconfigurable surface 217-1 may reflect a focused version of the reference signal in a direction). Also, first reconfigurable surface 217-1 may apply an "off" reflection to the second reference signal received in the second resource (that is, first reconfigurable surface 217-1 may reflect a dispersed version of the reference signal in multiple directions).

Second UE 215-2 may detect the first reference signal in the first reference signal resource with a first power level (e.g., RSRP) and the second reference signal in the second reference signal resource with a second power level that is similar to the first power level e.g., based on being in the direct path of base station 205. By contrast, third UE 215-3 may detect the first reference signal in the first reference signal resource with a first power level (e.g., RSRP) and the second reference signal in the second reference signal resource with a second power level that is significantly different (e.g., lower) than the first power level e.g., based on first reconfigurable surface applying the "off" reflection to the second reference signal.

Both second UE 215-2 and third UE 215-3 may report the measurements for the scheduled reference signal resources. If a single reference signal resource set includes the multiple reference signal resources, the UEs 215 may each transmit a single CSI report to base station 205 that is configured for multiple beam reporting. If multiple reference signal resource sets include the multiple reference signal resources, the UEs 215 may each transmit multiple CSI reports, where the reference signal resource sets may be configured as channel measurement resources.

Based on receiving the reports, base station 205 may determine that second UE 215-2 is in a second region positioned before first reconfigurable surface 217-1 (that is, in a direct path of base station 205) and that third UE 215-3 is in a third region positioned after first reconfigurable surface 217-1 (that is, in an indirect path of base station 205). Accordingly, base station 205 may determine to use a direct link to communicate with second UE 215-2 and an indirect link via first reconfigurable surface 217-1 to communicate with third UE 215-3, as similarly described above.

Figure 3:
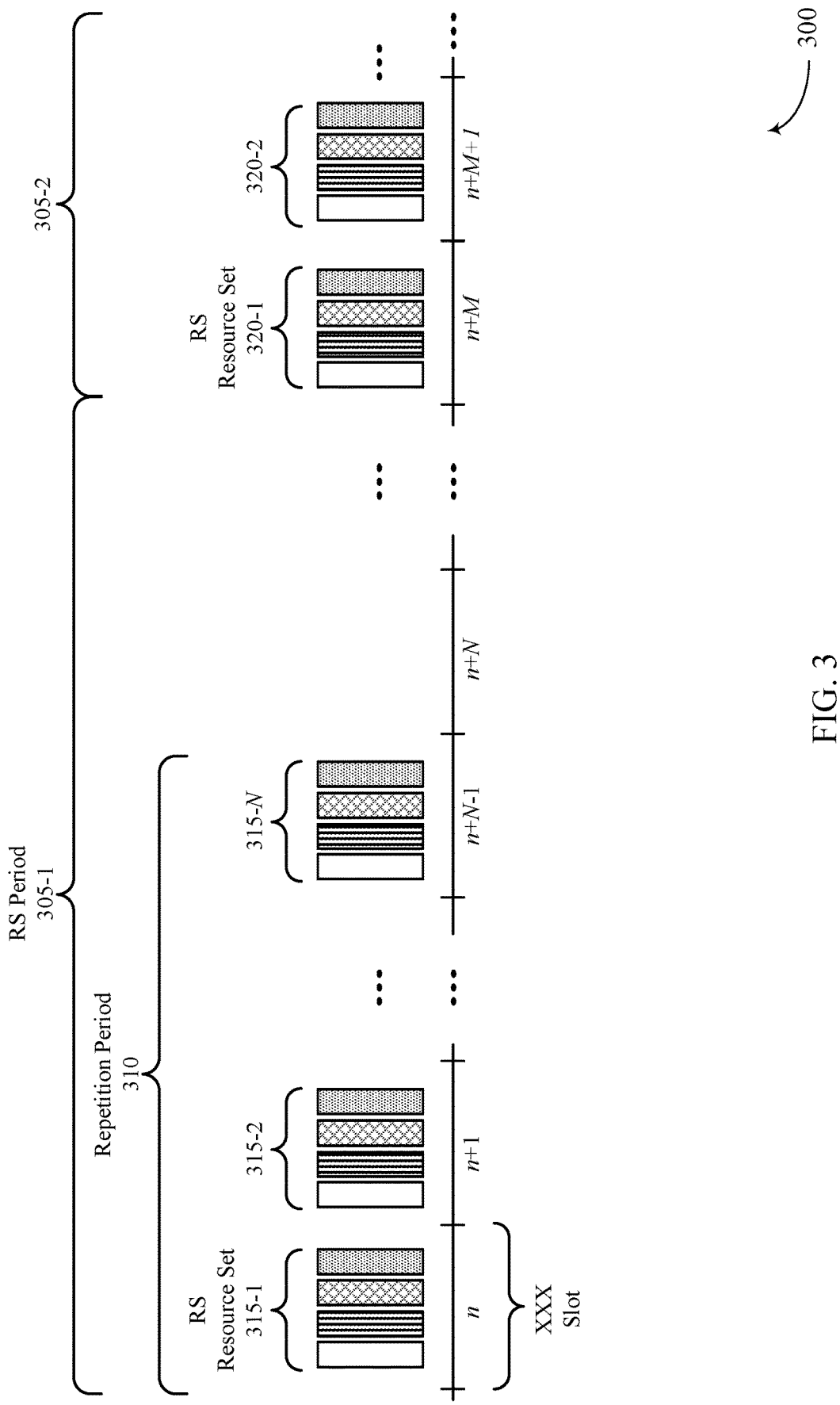
FIG. 3 illustrates an example of a resource diagram that supports channel reporting for reconfigurable surfaces in accordance with aspects of the present disclosure.

FIG. 3 illustrates an example of a resource diagram that supports channel reporting for reconfigurable surfaces in accordance with aspects of the present disclosure.

Resource diagram 300 depicts repetitions of reference signal (RS) resource sets used to support reporting channel information for reconfigurable surfaces. In some examples, RS resource sets may be repeated over N occasions (e.g., in N slots that compose repetition period 310). In some examples, a base station may transmit repetitions of a set of reference signals in respective RS resources of the RS resource sets. In some examples, the repetitions of the RS resource sets are scheduled in consecutive slots. In other examples, the repetitions of the RS resource sets are scheduled in non-consecutive slots.

A UE may determine that the corresponding resources in the RS resource sets (e.g., the initial RS resource in first RS resource set 315-1, the initial RS resource in second RS resource set 315-2, the initial RS resource in Nth RS resource set 315-N) are quasi-colocated with one another, share a same antenna port, or both. In some examples, a quantity of repetitions of reference signal resources is based on a repetition factor represented by N, where a value of N may be indicated to a reconfigurable surface, UE, or both in downlink signaling, such as RRC signaling, MAC CE signaling, or DCI signaling. In some examples, the repetition factor is included in a message used to indicate a CSI resource configuration. In some examples, a default value of N is equal to 1—e.g., to support devices that are not configured to receive repetitions of reference signal resources that are quasi-colocated or share a same antenna port.

If periodic (or semi-static) RS resources are configured with a periodicity M, repetitions of a new RS resource set may start at a beginning of each RS period 305. For example, repetitions of RS resource set 315 may start at a beginning of first RS period 305-1 (e.g., at slot n) and repetitions of a different RS resource 320 may start at a beginning of second RS period 305-2. In such cases, a duration of RS periods 305 may be greater than a duration of repetition periods 310 (e.g., M is greater than N).

In some examples, instead of including repetitions between periodic RS resource sets, N periods of a periodic RS resource sets may be repetitions. That is, second RS resource set 315-2, third RS resource set 315-3, second different RS resource set 320-2 may be omitted, and first different RS resource set 320-1 may be a repetition of first RS resource set 315-1, and so on. By repeating an RS resource set for N periods, repetitions of RS resource sets may be provisioned without provisioning additional resources for intermediary repetitions of the RS resources sets.

FIG. 4 illustrates an example of a composite signal associated with channel reporting for reconfigurable surfaces in accordance with aspects of the present disclosure.

Composite signal 400 depicts an example of a composite signal received at a device, such as third UE 215-3 of FIG. 2A or 2B. Composite signal may include multiple repetitions 405 of a reference signal (e.g., a CSI-RS signal). In some examples, the repetitions 405 span a slot or a communication resource (e.g., a resource block). Composite signal 400 may include N repetitions (e.g., N may equal four), where the quantity of repetitions 405 may be based on a quantity of reconfigurable surfaces in a geographic region—e.g., the quantity of repetitions 405 may be equal to or greater than the quantity of reconfigurable surfaces.

Composite signal 400 may include direct component 410 and one or more reflected components (e.g., one or more of first reflected component 415-1 through Mth reflected component 415-M). In some examples, M may equal two. In some examples, composite signal 400 additionally includes components associated with interference from other transmissions or reflections of nearby objects.

Direct component 410 may correspond to a signal received via a direct path between a base station (e.g. base station 205 of FIG. 2A or 2B) that transmits the signal and the UE that receives composite signal 400 (e.g., third UE 215-3 of FIG. 2A or 2B). The signal may include repetitions of CSI-RSs. In some examples, a modulation of direct component 410 may be the same as the modulation used by the base station to transmit the signal.

First reflected component 415-1 may correspond to a modulated signal received from a first reconfigurable surface (e.g., first reconfigurable surface 217-1 of FIG. 2A or 2B). The modulated signal may include modulated repetitions of the CSI-RSs transmitted by the base station. In some examples, a modulation of first reflected component 415-1 may be based on a modulation sequence assigned to the first reconfigurable surface, as similarly described with reference to FIG. 2A or 2B. In some examples, the modulation of first reflected component 415-1 is orthogonal to the modulation of direct component 410.

Mth reflected component 415-M may correspond to a modulated signal received from an Mth reconfigurable surface (e.g., second reconfigurable surface 217-2 of FIG. 2A or 2B). The modulated signal may include modulated repetitions of the CSI-RSs transmitted by the base station. In some examples, a modulation of Mth reflected component 415-M may be based on a modulation sequence assigned to the Mth reconfigurable surface, as similarly described with reference to FIG. 2A or 2B. In some examples, the modulation of Mth reflected component 415-M is orthogonal to the modulation of direct component 410 and the modulation of first reflected component 415-1.

In some examples, the modulation applied to the symbols of the different components is a phase modulation, an amplitude modulation (e.g., on/off keying), polarization, or spatial modulation. On/off keying at a reconfigurable surface may include switching between a configuration that reflects a received signal in a focused direction and a configuration that disperses a received signal across many directions.

In some examples, N is equal to four and direct component 410 is modulated (e.g., phase modulated) based on the sequence (+, +, +, +), first reflected component 415-1 is modulated based on the sequence (+, +, −), and Mth reflected component is modulated based on the sequence (+, +, −). In some examples, the sequence (+, +, +, +) may be associated with no phase modulation being applied to the signal.

Figure 5:
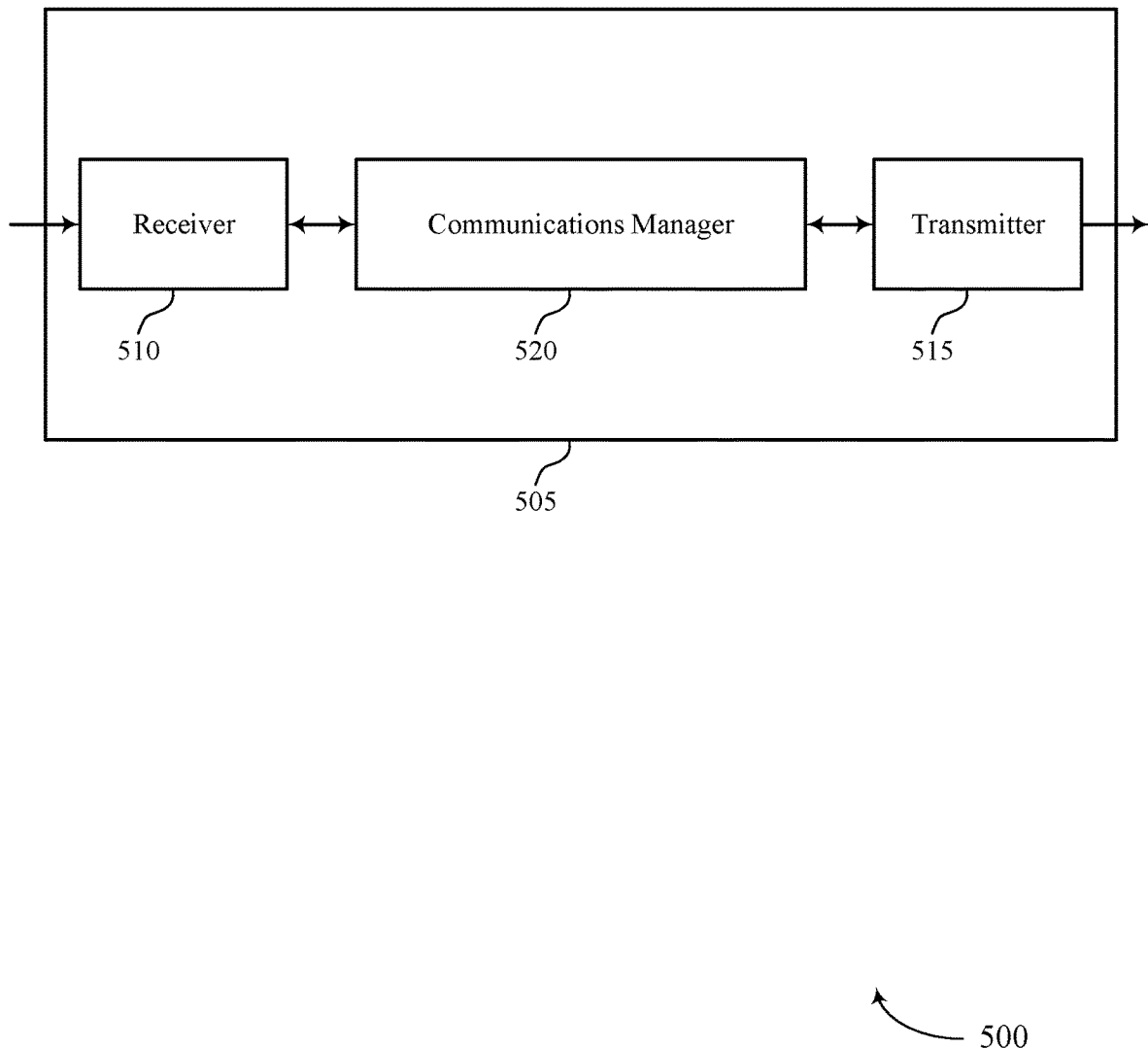
FIGS. 5 and 6 show block diagrams of devices that support channel reporting for reconfigurable surfaces in accordance with aspects of the present disclosure.

FIG. 5 shows a block diagram 500 of a device 505 that supports channel reporting for reconfigurable surfaces in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to channel reporting for reconfigurable surfaces). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to channel reporting for reconfigurable surfaces). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of channel reporting for reconfigurable surfaces as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first device in accordance with examples as disclosed herein. For example, the communications manager 520 may be configured as or otherwise support a means for establishing a connection with a second device. The communications manager 520 may be configured as or otherwise support a means for transmitting repetitions of a reference signal, the repetitions of the reference signal being quasi-colocated with one another or sharing an antenna port. The communications manager 520 may be configured as or otherwise support a means for receiving, from the second device and in response to transmitting the repetitions of the reference signal, a message including information about a channel between the first device and the second device. The communications manager 520 may be configured as or otherwise support a means for communicating with the second device based on the message.

Additionally, or alternatively, the communications manager 520 may support wireless communication at a first device in accordance with examples as disclosed herein. For example, the communications manager 520 may be configured as or otherwise support a means for scheduling, for a second device, a first reference signal resource and a second reference signal resource. The communications manager 520 may be configured as or otherwise support a means for transmitting a first reference signal using the first reference signal resource and a second reference signal using the second reference signal resource. The communications manager 520 may be configured as or otherwise support a means for receiving, from the second device and based on the first reference signal and the second reference signal, first information and second information about a channel between the first device and the second device, the first information being based on the first reference signal and the second information being based on the second reference signal. The communications manager 520 may be configured as or otherwise support a means for determining a position of the second device relative to the reconfigurable surface based on the first information and the second information.

By including or configuring the communications manager 520 in accordance with examples as described herein, the device 505 (e.g., a processor controlling or otherwise coupled to the receiver 510, the transmitter 515, the communications manager 520, or a combination thereof) may support techniques that enable a determination of whether to use a direct path or an indirect path via a reconfigurable surface, which may enable more efficient utilization of reconfigurable surfaces and increase a reliability and throughput of a radio access network.

Figure 6:
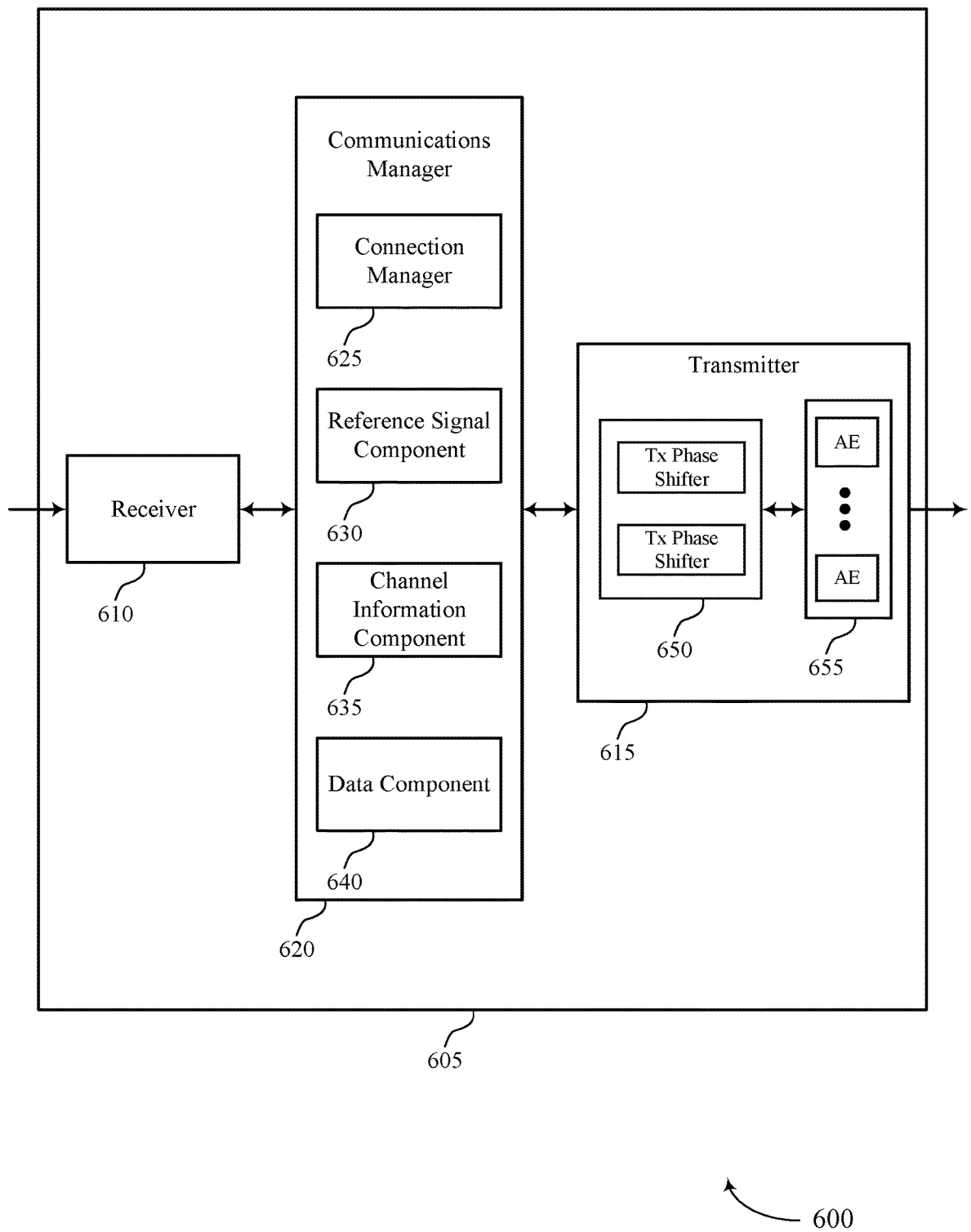

FIG. 6 shows a block diagram 600 of a device 605 that supports channel reporting for reconfigurable surfaces in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel reporting for reconfigurable surfaces). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel reporting for reconfigurable surfaces). In some examples, the transmitter 615 may be co-located with a receiver 610 in a transceiver module. The transmitter 615 may include one or more phase shifters 650 and one or more antenna elements 655. The transmitter 615 may utilize a single antenna or a set of multiple antennas.

A phase shifter 650 may provide a configurable phase shift or phase offset to a corresponding radio frequency signal to be transmitted on a respective antenna element 655. The settings of each of the phase shifters 650 may be independent, meaning that each can be set to provide a desired amount of phase shift or the same amount of phase shift or some other configuration. A modem or other processor may have at least one control line connected to each of the phase shifters 650 and which may be used to configure the phase shifters 650 to provide a desired amounts of phase shift or phase offset between antenna elements 655.

In at least one embodiment, changing or receiving a transmit or receive beam comprises adjusting relative phase shifts for signals on different antenna elements 655. The relative phase shifts may be achieved by the modem adjusting the phase shift of the one or more phase shifters 650. The set of phases for different phase shifters 650 (and corresponding antenna elements 655) may comprise the spatial receive parameters or spatial transmit parameters for a respective beam. To receive or transmit on a beam, the spatial parameters may need to be set before the beginning of the transmitting or receiving.

The device 605, or various components thereof, may be an example of means for performing various aspects of channel reporting for reconfigurable surfaces as described herein. For example, the communications manager 620 may include a connection manager 625, a reference signal component 630, a channel information component 635, a data component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device in accordance with examples as disclosed herein. The connection manager 625 may be configured as or otherwise support a means for establishing a connection with a second device. The reference signal component 630 may be configured as or otherwise support a means for transmitting repetitions of a reference signal, the repetitions of the reference signal being quasi-colocated with one another or sharing an antenna port. The channel information component 635 may be configured as or otherwise support a means for receiving, from the second device and in response to transmitting the repetitions of the reference signal, a message including information about a channel between the first device and the second device. The data component 640 may be configured as or otherwise support a means for communicating with the second device based on the message.

Additionally, or alternatively, the communications manager 620 may support wireless communication at a first device in accordance with examples as disclosed herein. The reference signal component 630 may be configured as or otherwise support a means for scheduling, for a second device, a first reference signal resource and a second reference signal resource. The reference signal component 630 may be configured as or otherwise support a means for transmitting a first reference signal using the first reference signal resource and a second reference signal using the second reference signal resource. The channel information component 635 may be configured as or otherwise support a means for receiving, from the second device and based on the first reference signal and the second reference signal, first information and second information about a channel between the first device and the second device, the first information being based on the first reference signal and the second information being based on the second reference signal. The data component 640 may be configured as or otherwise support a means for determining a position of the second device relative to the reconfigurable surface based on the first information and the second information.

Figure 7:
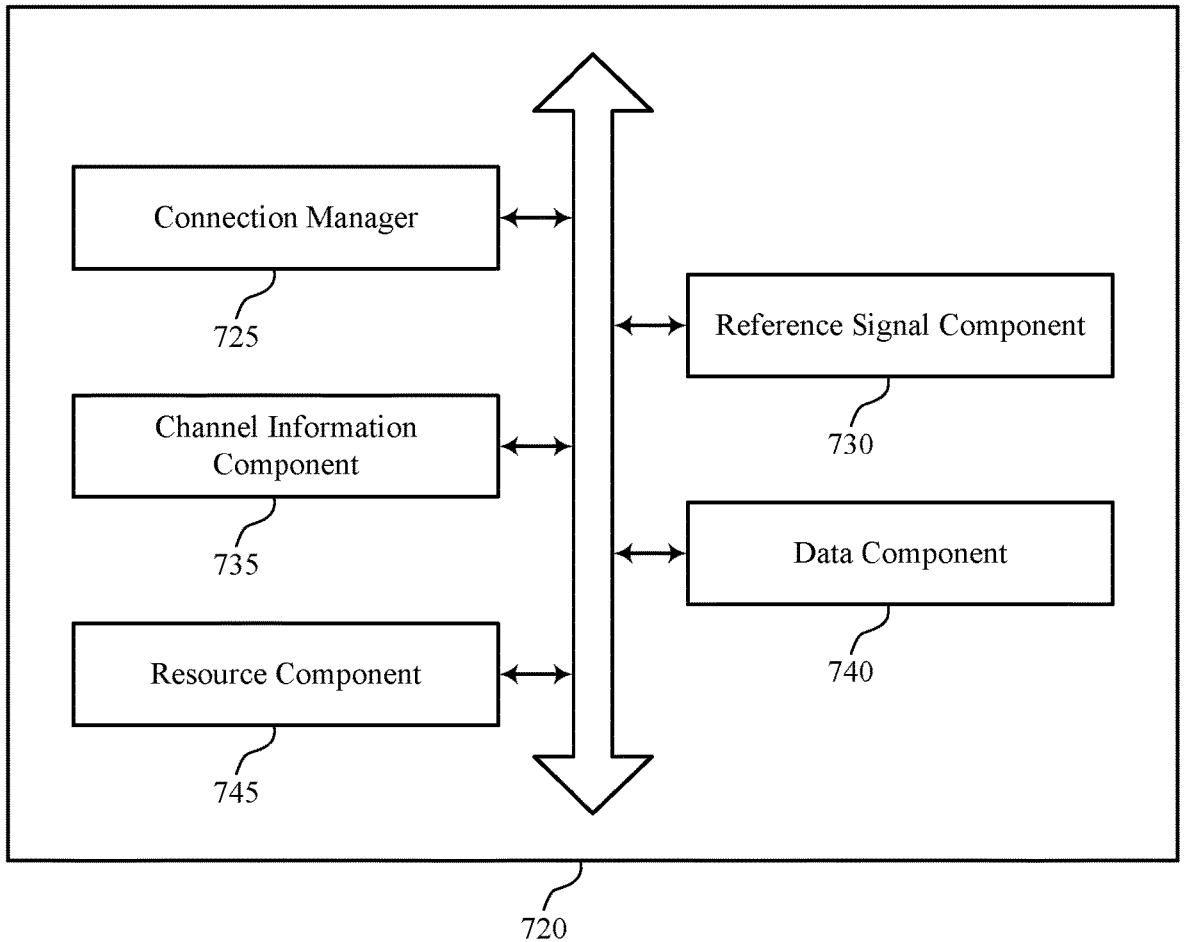
FIG. 7 shows a block diagram of a communications manager that supports channel reporting for reconfigurable surfaces in accordance with aspects of the present disclosure.

FIG. 7 shows a block diagram 700 of a communications manager 720 that supports channel reporting for reconfigurable surfaces in accordance with aspects of the present disclosure. The communications manager 720 may be an example of aspects of a communications manager 520, a communications manager 620, or both, as described herein. The communications manager 720, or various components thereof, may be an example of means for performing various aspects of channel reporting for reconfigurable surfaces as described herein. For example, the communications manager 720 may include a connection manager 725, a reference signal component 730, a channel information component 735, a data component 740, a resource component 745, or any combination thereof. Each of these components may communicate, directly or indirectly, with one another (e.g., via one or more buses).

The communications manager 720 may support wireless communication at a first device in accordance with examples as disclosed herein. The connection manager 725 may be configured as or otherwise support a means for establishing a connection with a second device. The reference signal component 730 may be configured as or otherwise support a means for transmitting repetitions of a reference signal, the repetitions of the reference signal being quasi-colocated with one another or sharing an antenna port. The channel information component 735 may be configured as or otherwise support a means for receiving, from the second device and in response to transmitting the repetitions of the reference signal, a message including information about a channel between the first device and the second device. The data component 740 may be configured as or otherwise support a means for communicating with the second device based on the message.

In some examples, the resource component 745 may be configured as or otherwise support a means for scheduling a first resource for transmitting a first repetition of a set of reference signals, the set of reference signals including the reference signal, and the first repetition of the set of reference signals including a first repetition of the reference signal. In some examples, the resource component 745 may be configured as or otherwise support a means for scheduling a second resource for transmitting a second repetition of the set of reference signals, the second repetition of the set of reference signals including a second repetition of the reference signal.

In some examples, to support transmitting the repetitions of the reference signal, the reference signal component 730 may be configured as or otherwise support a means for transmitting the first repetition of the reference signal using the first resource and the second repetition of the reference signal using the second resource.

In some examples, each reference signal of the first repetition of the set of reference signals is quasi-colocated or shares a respective antenna port with a respective reference signal of the second repetition of the set of reference signals.

In some examples, the first resource is scheduled during a first slot and the second resource is scheduled during a second slot that is consecutive with the first slot. In some examples, the first resource is scheduled during a first slot and the second resource is scheduled during a second slot that is separated from the first slot by one or more slots.

In some examples, the reference signal component 730 may be configured as or otherwise support a means for transmitting, to the second device and based on establishing the connection with the second device, a second message activating a mode associated with transmitting periodic reference signals, the reference signal and reference signals of the set of reference signals being of a same type as the periodic reference signals. In some examples, the resource component 745 may be configured as or otherwise support a means for scheduling, based on a period associated with the periodic reference signals, the first resource for transmitting the first repetition of the set of reference signals and a third resource for transmitting a first repetition of a second set of reference signals, the third resource occurring after the second resource.

In some examples, the period includes a first quantity of slots and a duration including the first resource and the second resource includes a second quantity of slots that is smaller than the first quantity of slots.

In some examples, the reference signal component 730 may be configured as or otherwise support a means for transmitting, to the second device and based on establishing the connection with the second device, a second message activating a mode associated with transmitting periodic reference signals, the reference signal and reference signals of the set of reference signals being of a same type as the periodic reference signals, where a duration between the first resource and the second resource is based on a period associated with the periodic reference signals.

In some examples, the reference signal component 730 may be configured as or otherwise support a means for transmitting, to the second device, an indication of a quantity of the repetitions of the reference signal.

In some examples, the channel information component 735 may be configured as or otherwise support a means for determining, based on the information about the channel received from the second device, first characteristics of a direct path between the first device and the second device and second characteristics of an indirect path between the first device and the second device via a reconfigurable surface. In some examples, the data component 740 may be configured as or otherwise support a means for determining whether to use the direct path or the indirect path to communicate with the second device based on the first characteristics and the second characteristics.

In some examples, the reference signal is associated with a first beam, and the reference signal component 730 may be configured as or otherwise support a means for transmitting, using a second beam, second repetitions of a second reference signal, where the message is received in response to transmitting the second repetitions of the second reference signal and includes second information about a second channel between the first device and the second device that is associated with the second beam. In some examples, the reference signal is associated with a first beam, and the data component 740 may be configured as or otherwise support a means for determining whether to use the beam or the second beam to communicate with the second device based on the message.

In some examples, the message includes first information about a direct path between the first device and the second device, second information about a first indirect path between the first device and the second device via a reconfigurable surface, and third information about a second indirect path between the first device and the second device via a second reconfigurable surface.

Additionally, or alternatively, the communications manager 720 may support wireless communication at a first device in accordance with examples as disclosed herein. In some examples, the reference signal component 730 may be configured as or otherwise support a means for scheduling, for a second device, a first reference signal resource and a second reference signal resource. In some examples, the reference signal component 730 may be configured as or otherwise support a means for transmitting a first reference signal using the first reference signal resource and a second reference signal using the second reference signal resource. In some examples, the channel information component 735 may be configured as or otherwise support a means for receiving, from the second device and based on the first reference signal and the second reference signal, first information and second information about a channel between the first device and the second device, the first information being based on the first reference signal and the second information being based on the second reference signal. In some examples, the data component 740 may be configured as or otherwise support a means for determining a position of the second device relative to the reconfigurable surface based on the first information and the second information.

In some examples, to support determining the position of the second device, the reference signal component 730 may be configured as or otherwise support a means for comparing, based on the first information and the second information, a received signal power of the first reference signal with a received power of the second reference signal. In some examples, to support determining the position of the second device, the data component 740 may be configured as or otherwise support a means for determining that the second device is in a first region associated with a direct path between the first device and the second device based on a difference between the first reference signal and the second reference signal being greater than a threshold.

In some examples, to support determining the position of the second device, the reference signal component 730 may be configured as or otherwise support a means for comparing, based on the first information and the second information, a received signal power of the first reference signal with a received power of the second reference signal. In some examples, to support determining the position of the second device, the data component 740 may be configured as or otherwise support a means for determining that the second device is in a second region associated with an indirect path between the first device and the second device via the reconfigurable surface based on a difference between the first reference signal and the second reference signal being less than a threshold.

In some examples, the reference signal component 730 may be configured as or otherwise support a means for configuring the reconfigurable surface to apply, to the first reference signal, a first modulation that reflects the first reference signal and, to the second reference signal, a second modulation that diffuses the second reference signal.

Figure 8:
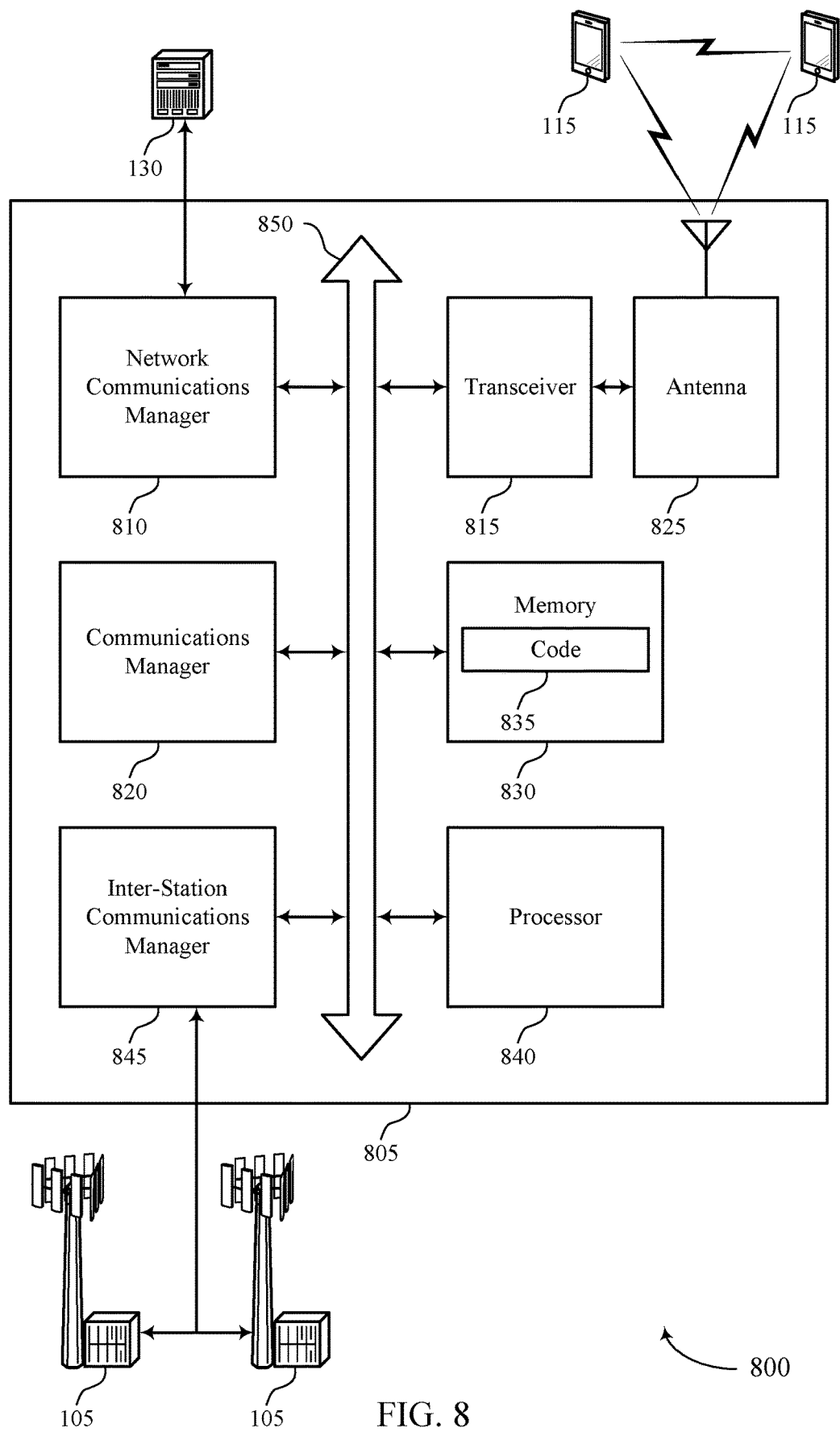
FIG. 8 shows a diagram of a system including a device that supports channel reporting for reconfigurable surfaces in accordance with aspects of the present disclosure.

FIG. 8 shows a diagram of a system 800 including a device 805 that supports channel reporting for reconfigurable surfaces in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting channel reporting for reconfigurable surfaces). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a first device in accordance with examples as disclosed herein. For example, the communications manager 820 may be configured as or otherwise support a means for establishing a connection with a second device. The communications manager 820 may be configured as or otherwise support a means for transmitting repetitions of a reference signal, the repetitions of the reference signal being quasi-colocated with one another or sharing an antenna port. The communications manager 820 may be configured as or otherwise support a means for receiving, from the second device and in response to transmitting the repetitions of the reference signal, a message including information about a channel between the first device and the second device. The communications manager 820 may be configured as or otherwise support a means for communicating with the second device based on the message.

Additionally, or alternatively, the communications manager 820 may support wireless communication at a first device in accordance with examples as disclosed herein. For example, the communications manager 820 may be configured as or otherwise support a means for scheduling, for a second device, a first reference signal resource and a second reference signal resource. The communications manager 820 may be configured as or otherwise support a means for transmitting a first reference signal using the first reference signal resource and a second reference signal using the second reference signal resource. The communications manager 820 may be configured as or otherwise support a means for receiving, from the second device and based on the first reference signal and the second reference signal, first information and second information about a channel between the first device and the second device, the first information being based on the first reference signal and the second information being based on the second reference signal. The communications manager 820 may be configured as or otherwise support a means for determining a position of the second device relative to the reconfigurable surface based on the first information and the second information.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of channel reporting for reconfigurable surfaces as described herein, or the processor 840 and the memory 830 may be otherwise configured to perform or support such operations.

Figure 9:
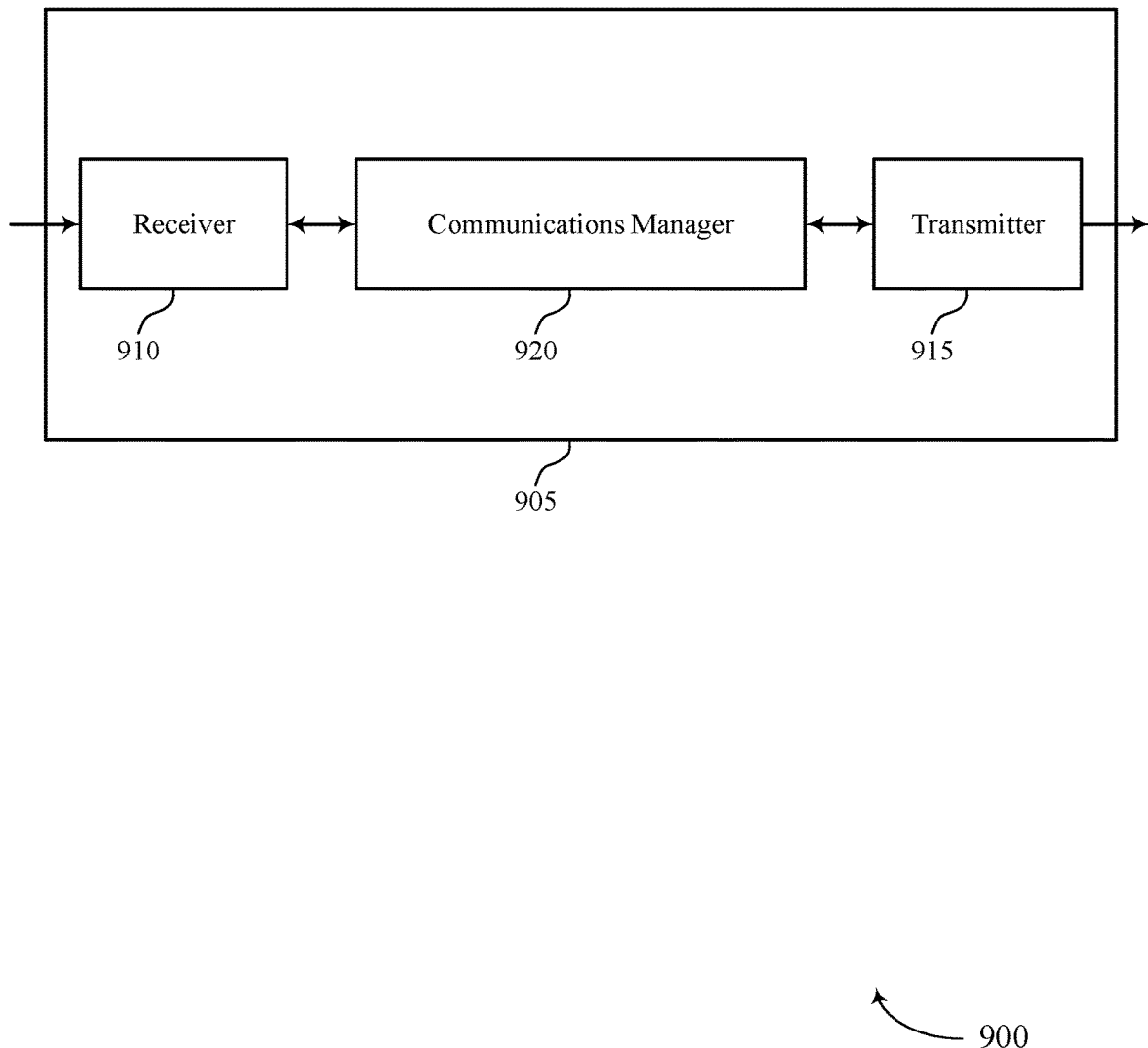
FIGS. 9 and 10 show block diagrams of devices that support channel reporting for reconfigurable surfaces in accordance with aspects of the present disclosure.

FIG. 9 shows a block diagram 900 of a device 905 that supports channel reporting for reconfigurable surfaces in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to channel reporting for reconfigurable surfaces). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to channel reporting for reconfigurable surfaces). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of channel reporting for reconfigurable surfaces as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a second device in accordance with examples as disclosed herein. For example, the communications manager 920 may be configured as or otherwise support a means for establishing a connection with a first device. The communications manager 920 may be configured as or otherwise support a means for receiving a signal based on establishing the connection with the first device, the signal being based on repetitions of a reference signal transmitted from the first device. The communications manager 920 may be configured as or otherwise support a means for combining the signal with a modulation sequence associated with a reconfigurable surface to obtain a combined signal. The communications manager 920 may be configured as or otherwise support a means for generating, for the reconfigurable surface and basing at least in part on the combined signal, information about a channel between the first device and the second device.

By including or configuring the communications manager 920 in accordance with examples as described herein, the device 905 (e.g., a processor controlling or otherwise coupled to the receiver 910, the transmitter 915, the communications manager 920, or a combination thereof) may support techniques that enable a determination of whether to use a direct path or an indirect path via a reconfigurable surface, which may enable more efficient utilization of reconfigurable surfaces and increase a reliability and throughput of a radio access network.

Figure 10:
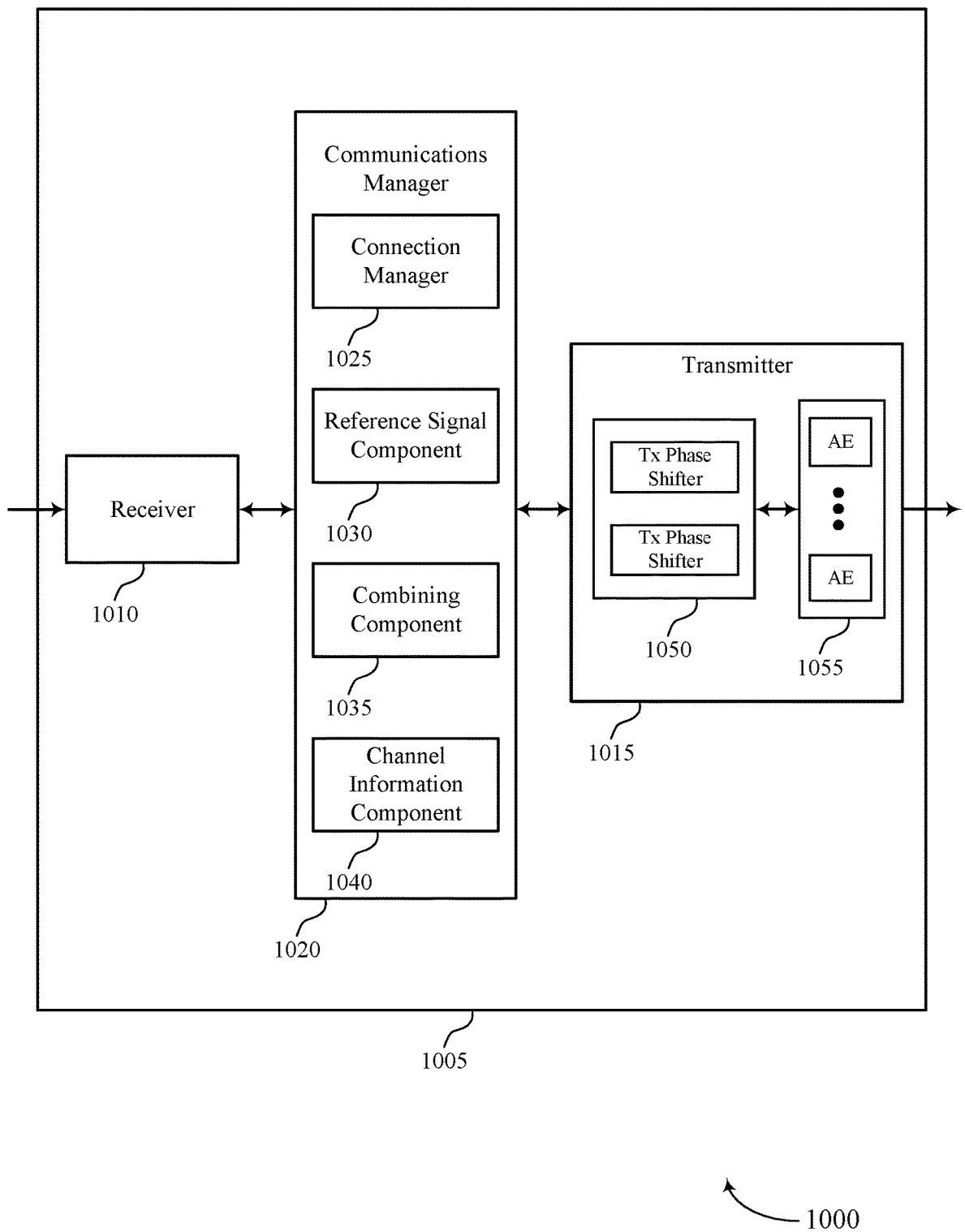

FIG. 10 shows a block diagram 1000 of a device 1005 that supports channel reporting for reconfigurable surfaces in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to channel reporting for reconfigurable surfaces). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to channel reporting for reconfigurable surfaces). In some examples, the transmitter 1015 may be co-located with a receiver 1010 in a transceiver module. The transmitter 1015 may include one or more phase shifters 1050 and one or more antenna elements 1055. The transmitter 1015 may utilize a single antenna or a set of multiple antennas.

A phase shifter 1050 may provide a configurable phase shift or phase offset to a corresponding radio frequency signal to be transmitted on a respective antenna element 1055. The settings of each of the phase shifters 1050 may be independent, meaning that each can be set to provide a desired amount of phase shift or the same amount of phase shift or some other configuration. A modem or other processor may have at least one control line connected to each of the phase shifters 1050 and which may be used to configure the phase shifters 1050 to provide a desired amounts of phase shift or phase offset between antenna elements 1055.

In at least one embodiment, changing or receiving a transmit or receive beam comprises adjusting relative phase shifts for signals on different antenna elements 1055. The relative phase shifts may be achieved by the modem adjusting the phase shift of the one or more phase shifters 1050. The set of phases for different phase shifters 1050 (and corresponding antenna elements 1055) may comprise the spatial receive parameters or spatial transmit parameters for a respective beam. To receive or transmit on a beam, the spatial parameters may need to be set before the beginning of the transmitting or receiving.

The device 1005, or various components thereof, may be an example of means for performing various aspects of channel reporting for reconfigurable surfaces as described herein. For example, the communications manager 1020 may include a connection manager 1025, a reference signal component 1030, a combining component 1035, a channel information component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a second device in accordance with examples as disclosed herein. The connection manager 1025 may be configured as or otherwise support a means for establishing a connection with a first device. The reference signal component 1030 may be configured as or otherwise support a means for receiving a signal based on establishing the connection with the first device, the signal being based on repetitions of a reference signal transmitted from the first device. The combining component 1035 may be configured as or otherwise support a means for combining the signal with a modulation sequence associated with a reconfigurable surface to obtain a combined signal. The channel information component 1040 may be configured as or otherwise support a means for generating, for the reconfigurable surface and based on the combined signal, information about a channel between the first device and the second device.

Figure 11:
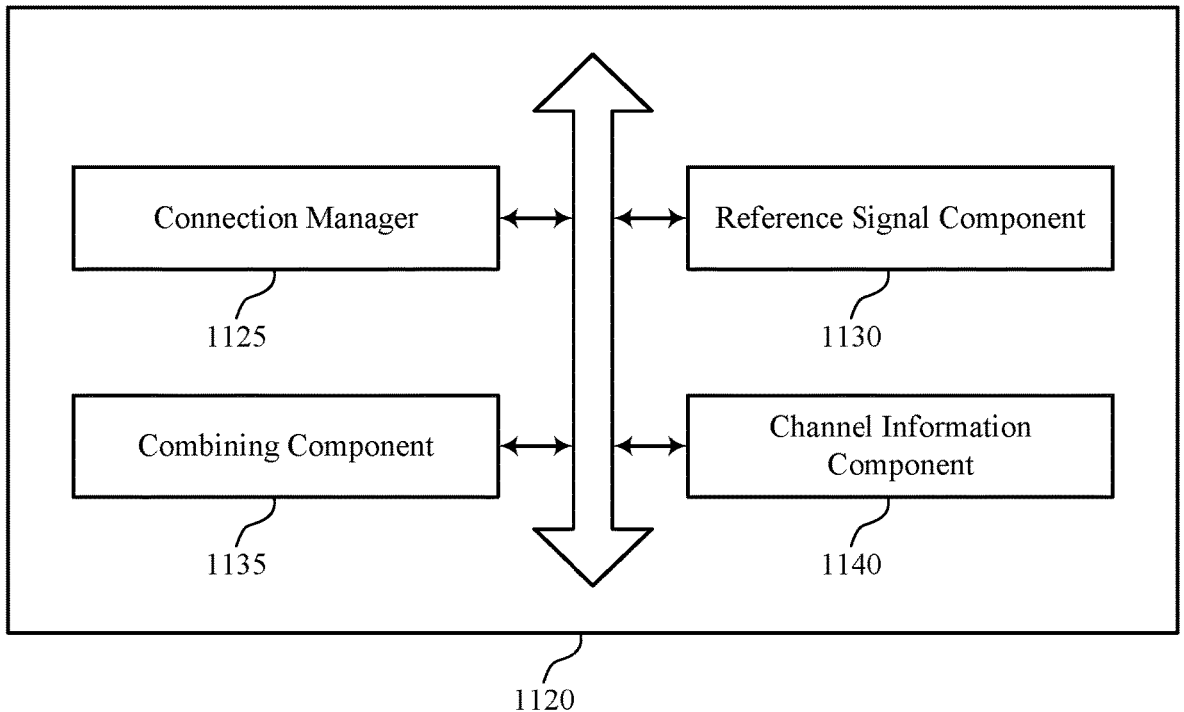
FIG. 11 shows a block diagram of a communications manager that supports channel reporting for reconfigurable surfaces in accordance with aspects of the present disclosure.

FIG. 11 shows a block diagram 1100 of a communications manager 1120 that supports channel reporting for reconfigurable surfaces in accordance with aspects of the present disclosure. The communications manager 1120 may be an example of aspects of a communications manager 920, a communications manager 1020, or both, as described herein. The communications manager 1120, or various components thereof, may be an example of means for performing various aspects of channel reporting for reconfigurable surfaces as described herein. For example, the communications manager 1120 may include a connection manager 1125, a reference signal component 1130, a combining component 1135, a channel information component 1140, or any combination thereof. Each of these components may communicate, directly or indirectly, with one another (e.g., via one or more buses).

The communications manager 1120 may support wireless communication at a second device in accordance with examples as disclosed herein. The connection manager 1125 may be configured as or otherwise support a means for establishing a connection with a first device. The reference signal component 1130 may be configured as or otherwise support a means for receiving a signal based on establishing the connection with the first device, the signal being based on repetitions of a reference signal transmitted from the first device. The combining component 1135 may be configured as or otherwise support a means for combining the signal with a modulation sequence associated with a reconfigurable surface to obtain a combined signal. The channel information component 1140 may be configured as or otherwise support a means for generating, for the reconfigurable surface and based on the combined signal, information about a channel between the first device and the second device.

In some examples, to support combining the signal with the modulation sequence, the combining component 1135 may be configured as or otherwise support a means for applying a first modulation of the modulation sequence to a first portion of the signal associated with a first repetition of the repetitions of the reference signal and a second modulation of the modulation sequence to a second portion of the signal associated with a second repetition of the repetitions of the reference signal.

In some examples, the combining component 1135 may be configured as or otherwise support a means for combining the signal with a second modulation sequence associated with a second reconfigurable surface, where combining the signal with the second modulation sequence includes applying a first modulation of the second modulation sequence to a first portion of the signal associated with a first repetition of the repetitions of the reference signal and a second modulation of the second modulation sequence to a second portion of the signal associated with a second repetition of the repetitions of the reference signal.

In some examples, the reference signal is associated with a beam of the first device, and the channel information component 1140 may be configured as or otherwise support a means for generating, for the beam, first information about an indirect path between the first device and the second device via the reconfigurable surface based on combining the signal with the modulation sequence. In some examples, the reference signal is associated with a beam of the first device, and the channel information component 1140 may be configured as or otherwise support a means for generating, for the beam, second information about a direct path between the first device and the second device based on combining the signal with the modulation sequence. In some examples, the reference signal is associated with a beam of the first device, and the channel information component 1140 may be configured as or otherwise support a means for generating a report including the first information and the second information. In some examples, the reference signal is associated with a beam of the first device, and the channel information component 1140 may be configured as or otherwise support a means for transmitting the report to the first device.

In some examples, the channel information component 1140 may be configured as or otherwise support a means for generating third information about a second indirect path between the first device and the second device via a second reconfigurable surface based on combining the signal with a second modulation sequence associated with the second reconfigurable surface, where the report includes the third information.

In some examples, the reference signal is associated with a beam of the first device, and the reference signal component 1130 may be configured as or otherwise support a means for receiving a second signal, the signal being based on repetitions of a second reference signal transmitted from the first device, and the second reference signal being associated with a second beam of the first device. In some examples, the reference signal is associated with a beam of the first device, and the combining component 1135 may be configured as or otherwise support a means for combining the second signal with the modulation sequence associated with the reconfigurable surface to obtain a second combined signal. In some examples, the reference signal is associated with a beam of the first device, and the channel information component 1140 may be configured as or otherwise support a means for generating, for the reconfigurable surface and based on the second combined signal, third information about a second channel between the first device and the second device that is associated with the second beam.

In some examples, the information includes a measurement of average power, a measurement of a signal-to-noise ratio, a measurement of a signal-to-interference-plus-noise ratio, a channel quality indicator, a precoding matrix indicator, a rank indicator, or a channel state information-reference signal resource indicator.

Figure 12:
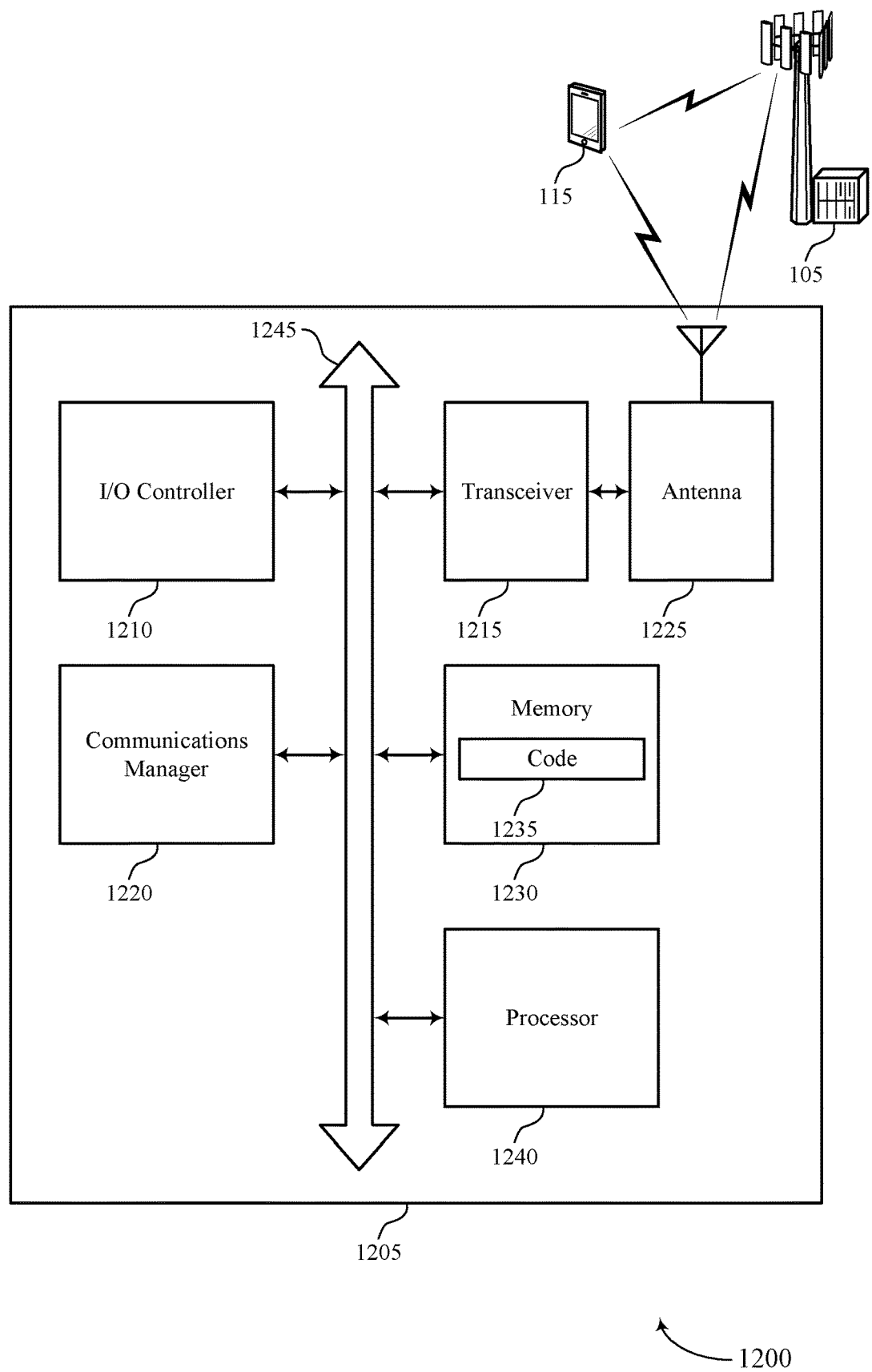
FIG. 12 shows a diagram of a system including a device that supports channel reporting for reconfigurable surfaces in accordance with aspects of the present disclosure.

FIG. 12 shows a diagram of a system 1200 including a device 1205 that supports channel reporting for reconfigurable surfaces in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting channel reporting for reconfigurable surfaces). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a second device in accordance with examples as disclosed herein. For example, the communications manager 1220 may be configured as or otherwise support a means for establishing a connection with a first device. The communications manager 1220 may be configured as or otherwise support a means for receiving a signal based on establishing the connection with the first device, the signal being based on repetitions of a reference signal transmitted from the first device. The communications manager 1220 may be configured as or otherwise support a means for combining the signal with a modulation sequence associated with a reconfigurable surface to obtain a combined signal. The communications manager 1220 may be configured as or otherwise support a means for generating, for the reconfigurable surface and basing at least in part on the combined signal, information about a channel between the first device and the second device.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of channel reporting for reconfigurable surfaces as described herein, or the processor 1240 and the memory 1230 may be otherwise configured to perform or support such operations.

Figure 13:
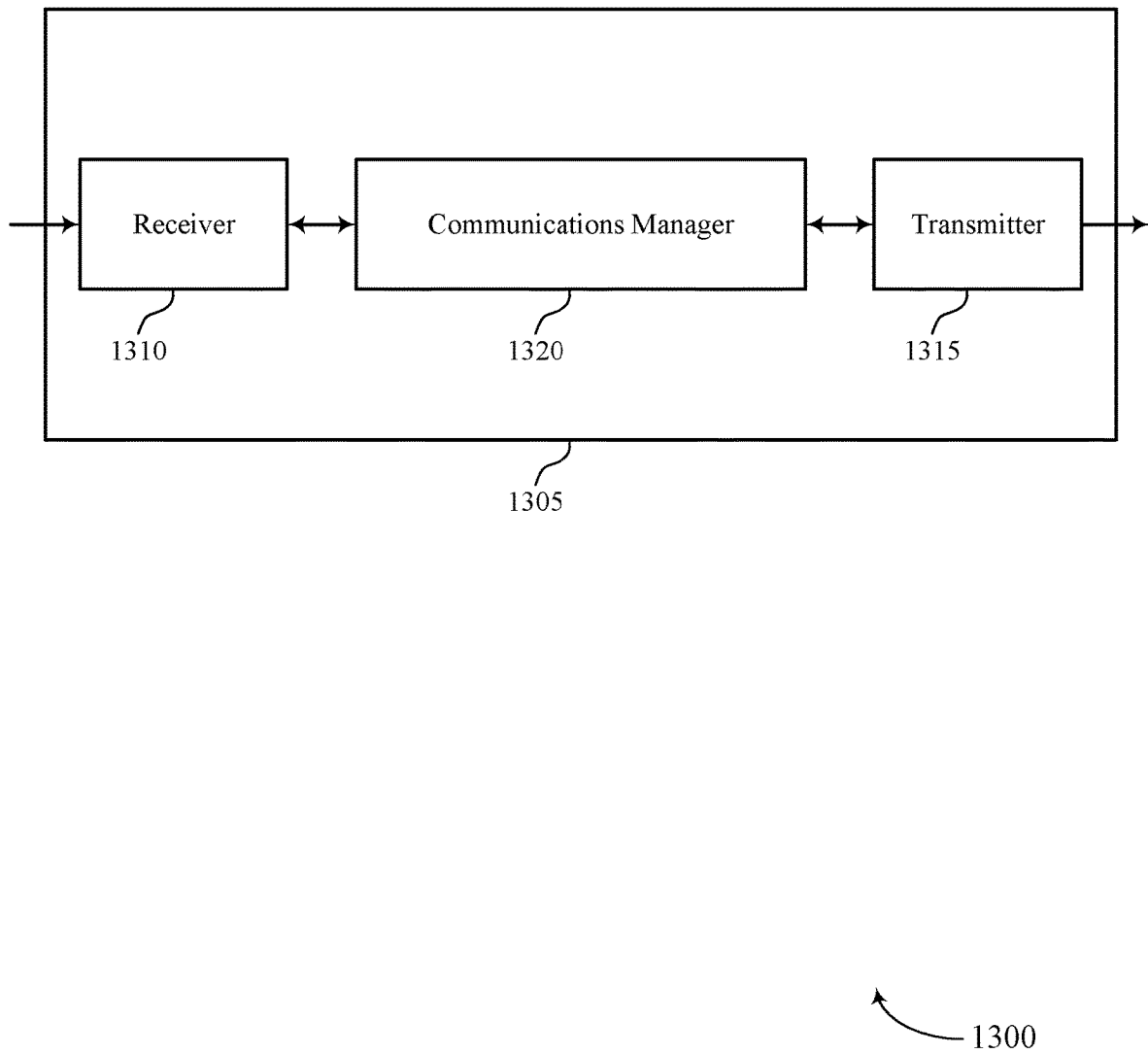
FIGS. 13 and 14 show block diagrams of devices that support channel reporting for reconfigurable surfaces in accordance with aspects of the present disclosure.

FIG. 13 shows a block diagram 1300 of a device 1305 that supports channel reporting for reconfigurable surfaces in accordance with aspects of the present disclosure. The device 1305 may be an example of aspects of a reconfigurable surface as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to channel reporting for reconfigurable surfaces). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to channel reporting for reconfigurable surfaces). In some examples, the transmitter 1315 may be co-located with a receiver 1310 in a transceiver module. The transmitter 1315 may utilize a single reflector or a set of multiple reflectors.

The communications manager 1320, the receiver 1310, the transmitter 1315, or various combinations thereof or various components thereof may be examples of means for performing various aspects of channel reporting for reconfigurable surfaces as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a reconfigurable surface in accordance with examples as disclosed herein. For example, the communications manager 1320 may be configured as or otherwise support a means for obtaining, from a first device, repetitions of a reference signal. The communications manager 1320 may be configured as or otherwise support a means for applying a modulation sequence to the repetitions of the reference signal to obtain a modulated signal, the modulation sequence being associated with the reconfigurable surface. The communications manager 1320 may be configured as or otherwise support a means for outputting the modulated signal based on applying the modulation sequence.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques that enable a determination of whether to use a direct path or an indirect path via a reconfigurable surface, which may enable more efficient utilization of reconfigurable surfaces and increase a reliability and throughput of a radio access network.

Figure 14:
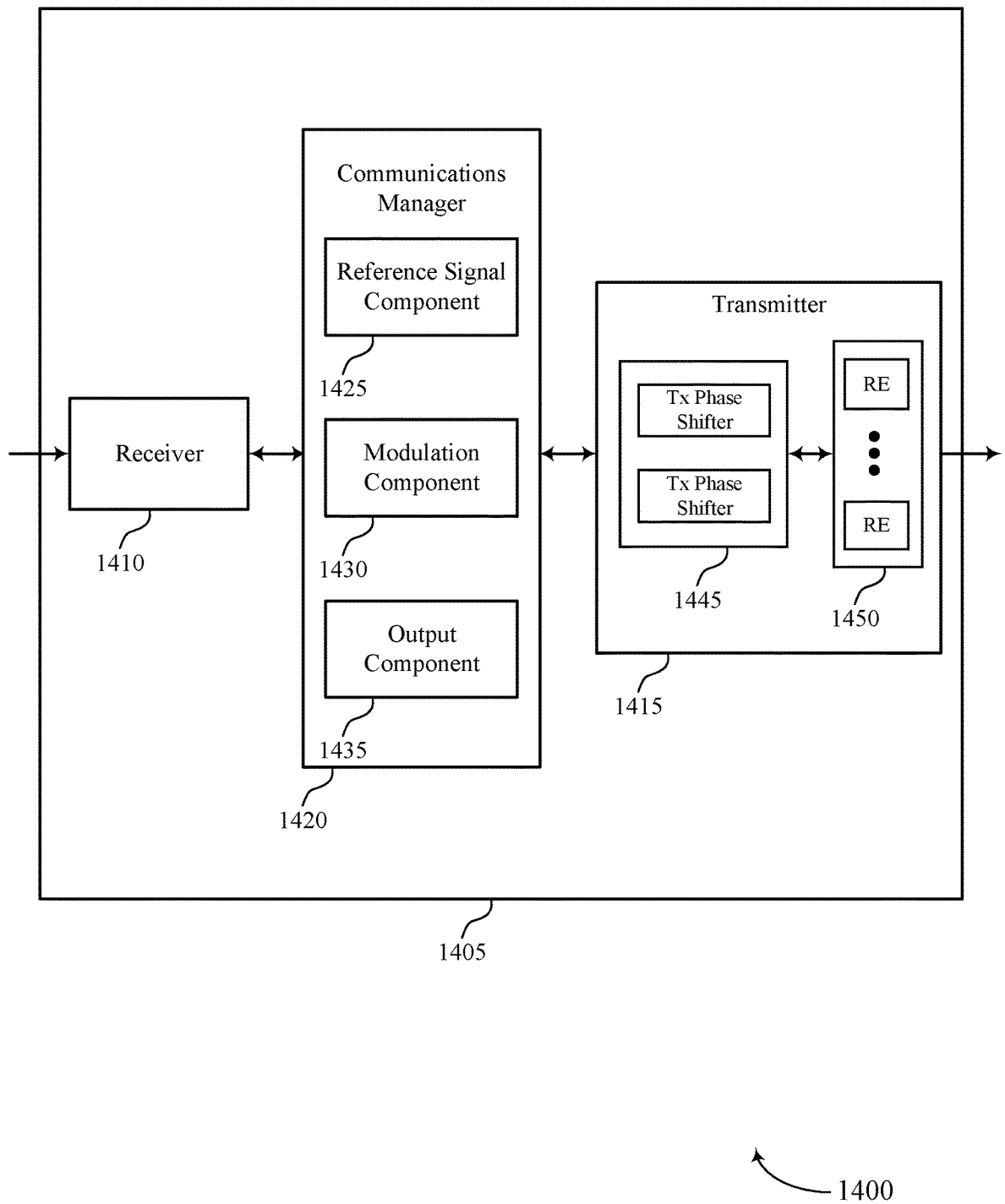

FIG. 14 shows a block diagram 1400 of a device 1405 that supports channel reporting for reconfigurable surfaces in accordance with aspects of the present disclosure. The device 1405 may be an example of aspects of a device 1305 or a reconfigurable surface 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to channel reporting for reconfigurable surfaces). Information may be passed on to other components of the device 1405. The receiver 1410 may utilize a single reflector or a set of multiple reflectors.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to channel reporting for reconfigurable surfaces). In some examples, the transmitter 1415 may be co-located with a receiver 1410 in a transceiver module. The transmitter 1415 may include one or more phase shifters 1445 and one or more reflective elements 1450. The transmitter 1415 may utilize a single reflector or a set of multiple reflectors.

A phase shifter 1445 may provide a configurable phase shift or phase offset to a corresponding radio frequency signal to be transmitted on a respective reflective element 1450. The settings of each of the phase shifters 1445 may be independent, meaning that each can be set to provide a desired amount of phase shift or the same amount of phase shift or some other configuration. A modem or other processor may have at least one control line connected to each of the phase shifters 1445 and which may be used to configure the phase shifters 1445 to provide a desired amounts of phase shift or phase offset between reflective elements 1450.

In at least one embodiment, changing or receiving a transmit or receive beam comprises adjusting relative phase shifts for signals on different reflective elements 1450. The relative phase shifts may be achieved by the modem adjusting the phase shift of the one or more phase shifters 1445. The set of phases for different phase shifters 1445 (and corresponding reflective elements 1450) may comprise the spatial receive parameters or spatial transmit parameters for a respective beam. To receive or transmit on a beam, the spatial parameters may need to be set before the beginning of the transmitting or receiving.

The communications manager 1420 may support wireless communication at a reconfigurable surface in accordance with examples as disclosed herein. The reference signal component 1425 may be configured as or otherwise support a means for obtaining, from a first device, repetitions of a reference signal. The modulation component 1430 may be configured as or otherwise support a means for applying a modulation sequence to the repetitions of the reference signal to obtain a modulated signal, the modulation sequence being associated with the reconfigurable surface. The output component 1435 may be configured as or otherwise support a means for outputting the modulated signal based on applying the modulation sequence.

Figure 15:
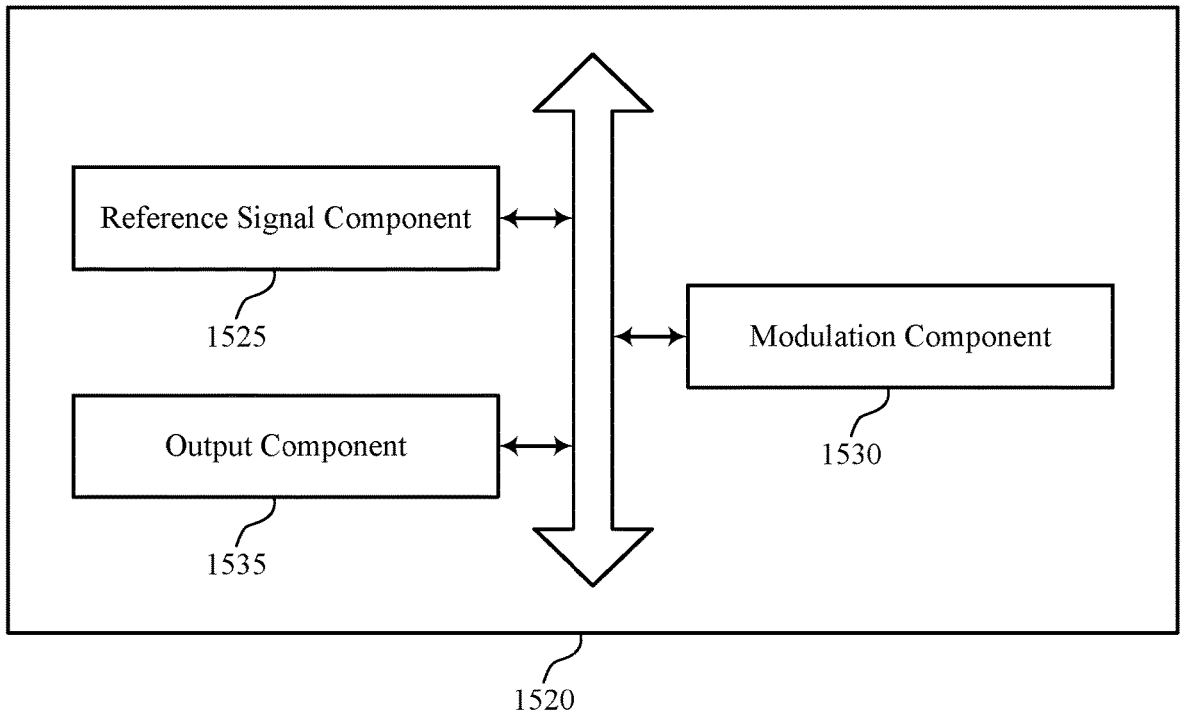
FIG. 15 shows a block diagram of a communications manager that supports channel reporting for reconfigurable surfaces in accordance with aspects of the present disclosure.

FIG. 15 shows a block diagram 1500 of a communications manager 1520 that supports channel reporting for reconfigurable surfaces in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of channel reporting for reconfigurable surfaces as described herein. For example, the communications manager 1520 may include a reference signal component 1525, a modulation component 1530, an output component 1535, or any combination thereof. Each of these components may communicate, directly or indirectly, with one another (e.g., via one or more buses).

The communications manager 1520 may support wireless communication at a reconfigurable surface in accordance with examples as disclosed herein. The reference signal component 1525 may be configured as or otherwise support a means for obtaining, from a first device, repetitions of a reference signal. The modulation component 1530 may be configured as or otherwise support a means for applying a modulation sequence to the repetitions of the reference signal to obtain a modulated signal, the modulation sequence being associated with the reconfigurable surface. The output component 1535 may be configured as or otherwise support a means for outputting the modulated signal based on applying the modulation sequence.

In some examples, to support applying the modulation sequence to the repetitions of the reference signal, the modulation component 1530 may be configured as or otherwise support a means for applying a first modulation of the modulation sequence to a first repetition of the reference signal and a second modulation of the modulation sequence to a second repetition of the reference signal.

In some examples, to support applying the modulation sequence to the repetitions of the reference signal, the modulation component 1530 may be configured as or otherwise support a means for applying a phase modulation, an amplitude modulation, a polarization, or a spatial modulation to the repetitions of the reference signal.

In some examples, the reference signal component 1525 may be configured as or otherwise support a means for receiving an indication of a quantity of the repetitions of the reference signal.

In some examples, the reference signal component 1525 may be configured as or otherwise support a means for receiving an indication of a set of resources scheduled for transmission of the repetitions of the reference signal.

In some examples, the modulation component 1530 may be configured as or otherwise support a means for receiving a message assigning a set of multiple modulation sequences to the reconfigurable surface, where each modulation sequence of the set of multiple modulation sequences is associated with the reconfigurable surface and an angle of reflection from the reconfigurable surface. In some examples, the modulation component 1530 may be configured as or otherwise support a means for selecting the modulation sequence from the set of multiple modulation sequences based on an angle of reflection configured at the reconfigurable surface.

Figure 16:
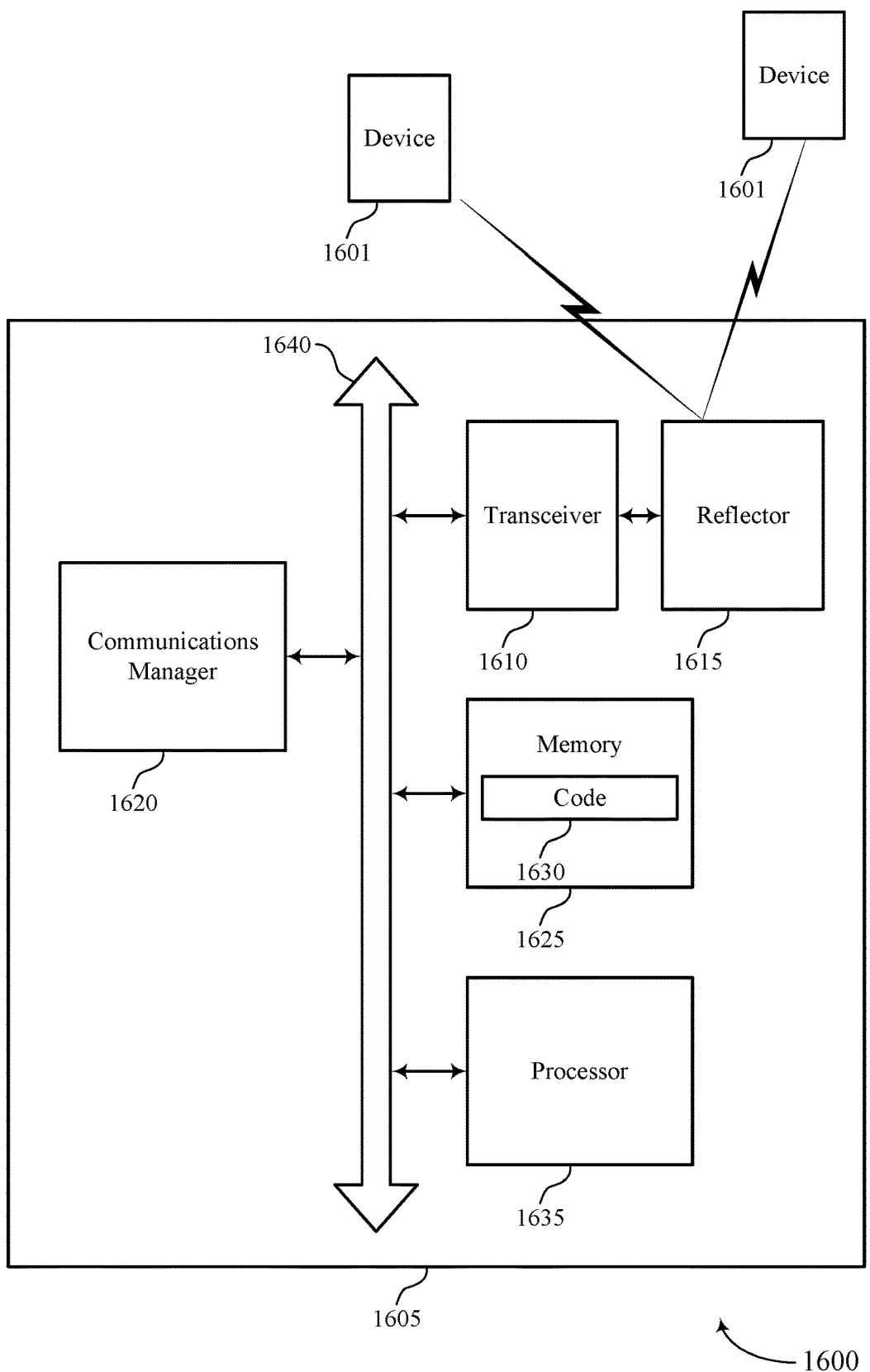
FIG. 16 shows a diagram of a system including a device that supports channel reporting for reconfigurable surfaces in accordance with aspects of the present disclosure.

FIG. 16 shows a diagram of a system 1600 including a device 1605 that supports channel reporting for reconfigurable surfaces in accordance with aspects of the present disclosure. The device 1605 may be an example of or include the components of a device 1305, a device 1405, or a reconfigurable surface as described herein. Device 1605 may be configured to direct reflections of transmissions from one device 1601 (e.g., a base station or UE) in the direction of another device 1605 (e.g., a base station or UE).

The device 1605 may include components for bi-directional voice and data communications including components for transmitting and receiving communications, such as a communications manager 1620, a transceiver 1610, a reflector 1615, a memory 1625, code 1630, and a processor 1635. These components may be in electronic communication or otherwise coupled (e.g., operatively, communicatively, functionally, electronically, electrically) via one or more buses (e.g., a bus 1640).

In some cases, the device 1605 may include a reflector 1615. The reflector 1615 may include one or more reflective elements and may be referred to as a reflective surface, reconfigurable surface, or reconfigurable intelligent surface. In some examples, the reflector 1615 includes one or more reflective elements (which may include transmission lines, reflectors, antennas, etc.). The transceiver 1610 may be used to relay communications between devices, via the reflector 1615. In some examples, the transceiver 1610 may be coupled with one or more antennas used to received signals and may relay the received signal by transmitting modified versions of the received signals through the reflector 1615. In some examples, the transceiver 1610 applies reflection coefficients to the received signals before transmitting the received signals from the reflector 1615. The transceiver 1610 may be an example of a transmitter 1315, a transmitter 1415, a receiver 1310, a receiver 1410, or any combination thereof or component thereof, as described herein.

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting channel reporting for reconfigurable surfaces). For example, the device 1605 or a component of the device 1605 may include a processor 1635 and memory 1625 coupled to the processor 1635, the processor 1635 and memory 1625 configured to perform various functions described herein.

The communications manager 1620 may support wireless communication at a reconfigurable surface in accordance with examples as disclosed herein. For example, the communications manager 1620 may be configured as or otherwise support a means for obtaining, from a first device, repetitions of a reference signal. The communications manager 1620 may be configured as or otherwise support a means for applying a modulation sequence to the repetitions of the reference signal to obtain a modulated signal, the modulation sequence being associated with the reconfigurable surface. The communications manager 1620 may be configured as or otherwise support a means for outputting the modulated signal based on applying the modulation sequence.

In some examples, the communications manager 1620 may be configured to perform various operations (e.g., receiving, monitoring, transmitting) using or otherwise in cooperation with the transceiver 1610, the reflector 1615, or any combination thereof. Although the communications manager 1620 is illustrated as a separate component, in some examples, one or more functions described with reference to the communications manager 1620 may be supported by or performed by the processor 1635, the memory 1625, the code 1630, or any combination thereof. For example, the code 1630 may include instructions executable by the processor 1635 to cause the device 1605 to perform various aspects of channel reporting for reconfigurable surfaces as described herein, or the processor 1635 and the memory 1625 may be otherwise configured to perform or support such operations.

Figure 17:
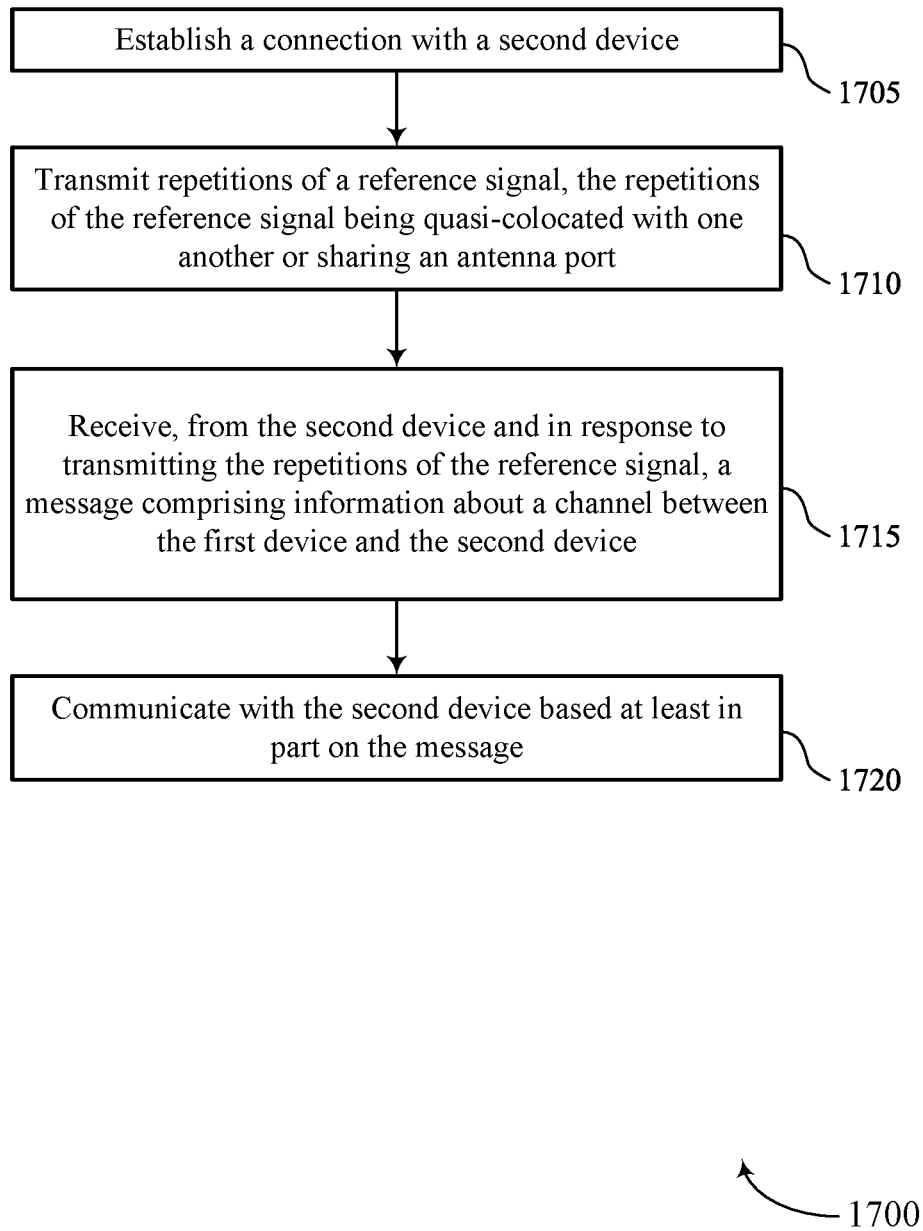
FIGS. 17 through 20 show flowcharts illustrating methods that support channel reporting for reconfigurable surfaces in accordance with aspects of the present disclosure.

FIG. 17 shows a flowchart illustrating a method 1700 that supports channel reporting for reconfigurable surfaces in accordance with aspects of the present disclosure. The operations of the method 1700 may be implemented by a base station or its components as described herein. For example, the operations of the method 1700 may be performed by a base station 105 as described with reference to FIGS. 1 through 8. In some examples, a base station may execute a set of instructions to control the functional elements of the base station to perform the described functions. Additionally, or alternatively, the base station may perform aspects of the described functions using special-purpose hardware.

At 1705, the method may include establishing a connection with a second device. The operations of 1705 may be performed in accordance with examples as disclosed herein. In some examples, aspects of the operations of 1705 may be performed by a connection manager 725 as described with reference to FIG. 7.

At 1710, the method may include transmitting repetitions of a reference signal, the repetitions of the reference signal being quasi-colocated with one another or sharing an antenna port. The operations of 1710 may be performed in accordance with examples as disclosed herein. In some examples, aspects of the operations of 1710 may be performed by a reference signal component 730 as described with reference to FIG. 7.

At 1715, the method may include receiving, from the second device and in response to transmitting the repetitions of the reference signal, a message comprising information about a channel between the first device and the second device. The operations of 1715 may be performed in accordance with examples as disclosed herein. In some examples, aspects of the operations of 1715 may be performed by a channel information component 735 as described with reference to FIG. 7.

At 1720, the method may include communicating with the second device based on the message. The operations of 1720 may be performed in accordance with examples as disclosed herein. In some examples, aspects of the operations of 1720 may be performed by a data component 740 as described with reference to FIG. 7.

Figure 18:
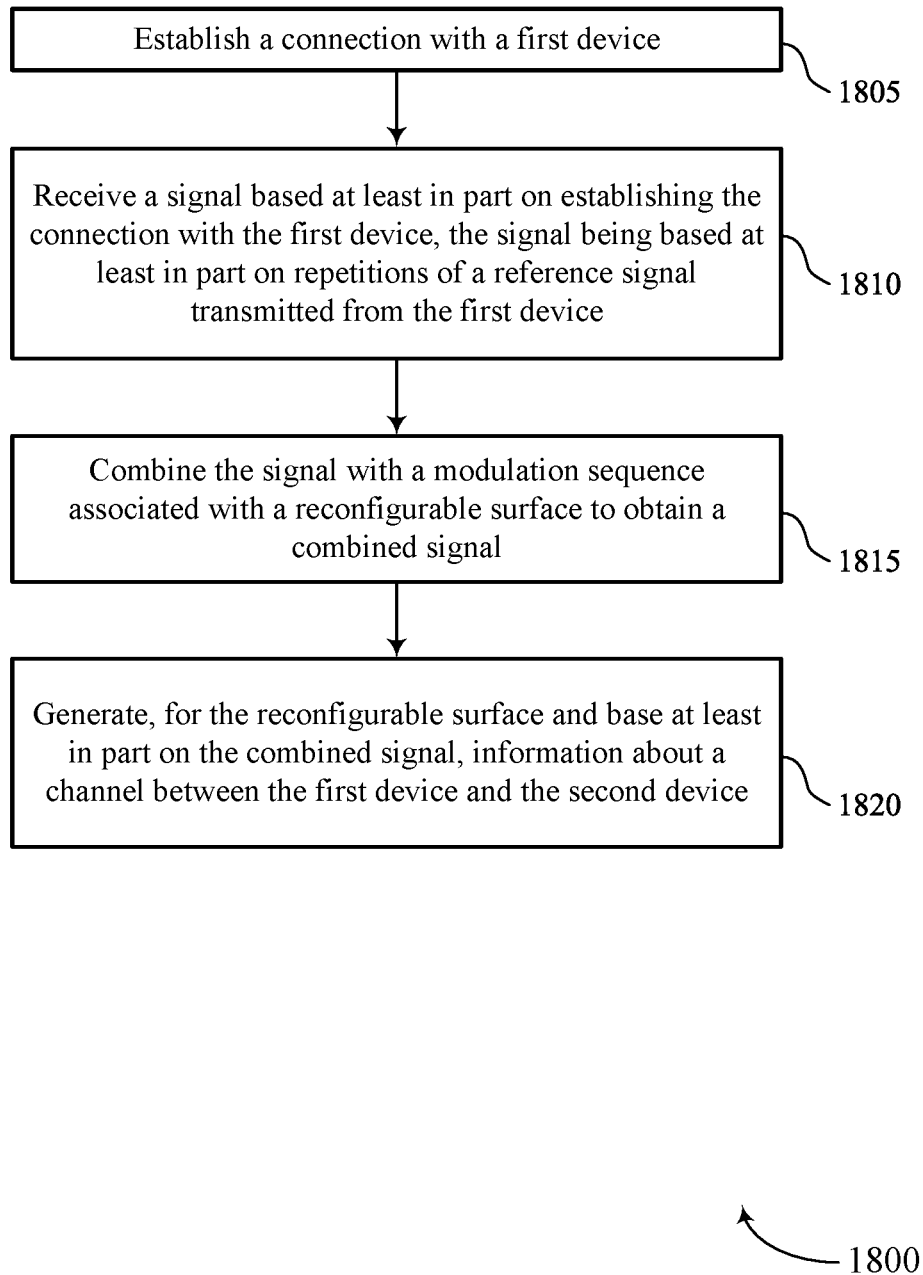

FIG. 18 shows a flowchart illustrating a method 1800 that supports channel reporting for reconfigurable surfaces in accordance with aspects of the present disclosure. The operations of the method 1800 may be implemented by a UE or its components as described herein. For example, the operations of the method 1800 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1805, the method may include establishing a connection with a first device. The operations of 1805 may be performed in accordance with examples as disclosed herein. In some examples, aspects of the operations of 1805 may be performed by a connection manager 1125 as described with reference to FIG. 11.

At 1810, the method may include receiving a signal based on establishing the connection with the first device, the signal being based on repetitions of a reference signal transmitted from the first device. The operations of 1810 may be performed in accordance with examples as disclosed herein. In some examples, aspects of the operations of 1810 may be performed by a reference signal component 1130 as described with reference to FIG. 11.

At 1815, the method may include combining the signal with a modulation sequence associated with a reconfigurable surface to obtain a combined signal. The operations of 1815 may be performed in accordance with examples as disclosed herein. In some examples, aspects of the operations of 1815 may be performed by a combining component 1135 as described with reference to FIG. 11.

At 1820, the method may include generating, for the reconfigurable surface and based on the combined signal, information about a channel between the first device and the second device. The operations of 1820 may be performed in accordance with examples as disclosed herein. In some examples, aspects of the operations of 1820 may be performed by a channel information component 1140 as described with reference to FIG. 11.

Figure 19:
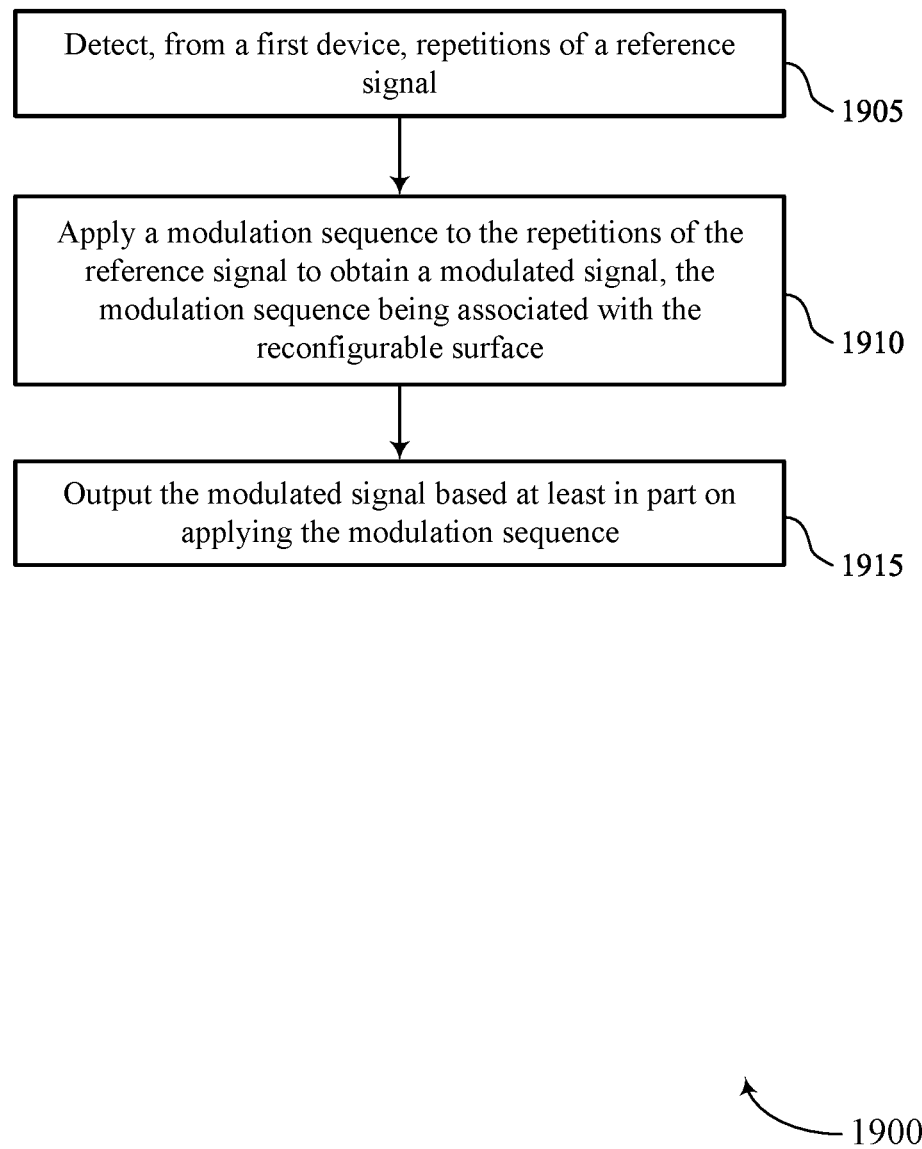

FIG. 19 shows a flowchart illustrating a method 1900 that supports channel reporting for reconfigurable surfaces in accordance with aspects of the present disclosure. The operations of the method 1900 may be implemented by a reconfigurable surface or its components as described herein. For example, the operations of the method 1900 may be performed by a reconfigurable surface as described with reference to FIGS. 1 through 4 and 13 through 16. In some examples, a reconfigurable surface may execute a set of instructions to control the functional elements of the reconfigurable surface to perform the described functions. Additionally, or alternatively, the reconfigurable surface may perform aspects of the described functions using special-purpose hardware.

At 1905, the method may include obtaining, from a first device, repetitions of a reference signal. The operations of 1905 may be performed in accordance with examples as disclosed herein. In some examples, aspects of the operations of 1905 may be performed by a reference signal component 1525 as described with reference to FIG. 15.

At 1910, the method may include applying a modulation sequence to the repetitions of the reference signal to obtain a modulated signal, the modulation sequence being associated with the reconfigurable surface. The operations of 1910 may be performed in accordance with examples as disclosed herein. In some examples, aspects of the operations of 1910 may be performed by a modulation component 1530 as described with reference to FIG. 15.

At 1915, the method may include outputting the modulated signal based on applying the modulation sequence. The operations of 1915 may be performed in accordance with examples as disclosed herein. In some examples, aspects of the operations of 1915 may be performed by an output component 1535 as described with reference to FIG. 15.

Figure 20:
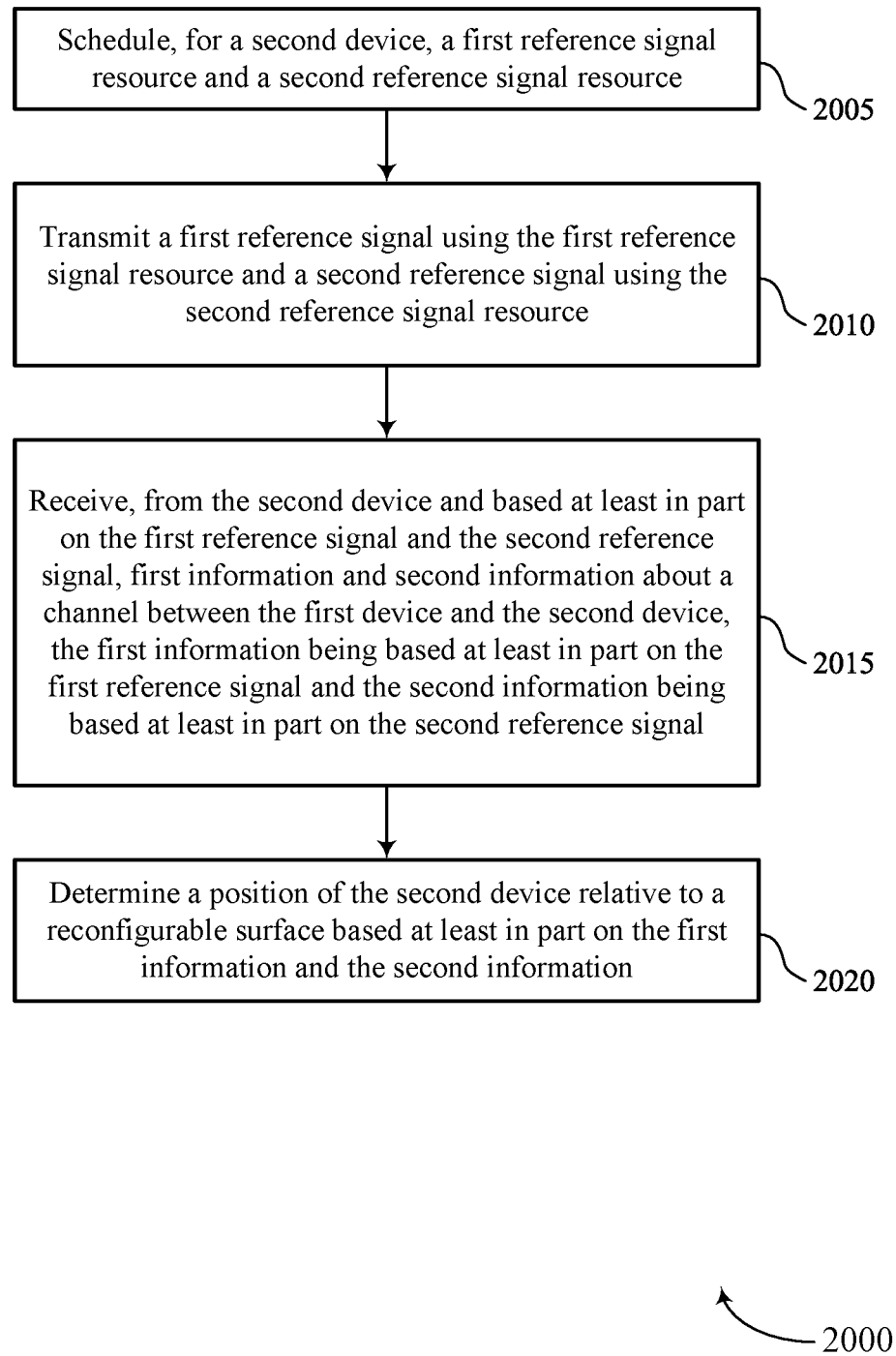

FIG. 20 shows a flowchart illustrating a method 2000 that supports channel reporting for reconfigurable surfaces in accordance with aspects of the present disclosure. The operations of the method 2000 may be implemented by a base station or its components as described herein. For example, the operations of the method 2000 may be performed by a base station 105 as described with reference to FIGS. 1 through 8. In some examples, a base station may execute a set of instructions to control the functional elements of the base station to perform the described functions. Additionally, or alternatively, the base station may perform aspects of the described functions using special-purpose hardware.

At 2005, the method may include scheduling, for a second device, a first reference signal resource and a second reference signal resource. The operations of 2005 may be performed in accordance with examples as disclosed herein. In some examples, aspects of the operations of 2005 may be performed by a reference signal component 730 as described with reference to FIG. 7.

At 2010, the method may include transmitting a first reference signal using the first reference signal resource and a second reference signal using the second reference signal resource. The operations of 2010 may be performed in accordance with examples as disclosed herein. In some examples, aspects of the operations of 2010 may be performed by a reference signal component 730 as described with reference to FIG. 7.

At 2015, the method may include receiving, from the second device and based on the first reference signal and the second reference signal, first information and second information about a channel between the first device and the second device, the first information being based on the first reference signal and the second information being based on the second reference signal. The operations of 2015 may be performed in accordance with examples as disclosed herein. In some examples, aspects of the operations of 2015 may be performed by a channel information component 735 as described with reference to FIG. 7.

At 2020, the method may include determining a position of the second device relative to a reconfigurable surface based on the first information and the second information. The operations of 2020 may be performed in accordance with examples as disclosed herein. In some examples, aspects of the operations of 2020 may be performed by a data component 740 as described with reference to FIG. 7.

The following provides an overview of aspects of the present disclosure:

Aspect 1: A method for wireless communication at a first device, comprising: establishing a connection with a second device; transmitting repetitions of a reference signal, the repetitions of the reference signal being quasi-colocated with one another or sharing an antenna port; receiving, from the second device and in response to transmitting the repetitions of the reference signal, a message comprising information about a channel between the first device and the second device; and communicating with the second device based at least in part on the message.

Aspect 2: The method of aspect 1, further comprising: scheduling a first resource for transmitting a first repetition of a set of reference signals, the set of reference signals comprising the reference signal, and the first repetition of the set of reference signals comprising a first repetition of the reference signal; and scheduling a second resource for transmitting a second repetition of the set of reference signals, the second repetition of the set of reference signals comprising a second repetition of the reference signal.

Aspect 3: The method of aspect 2, wherein transmitting the repetitions of the reference signal comprises: transmitting the first repetition of the reference signal using the first resource and the second repetition of the reference signal using the second resource.

Aspect 4: The method of any of aspects 2 through 3, wherein each reference signal of the first repetition of the set of reference signals is quasi-colocated or shares a respective antenna port with a respective reference signal of the second repetition of the set of reference signals.

Aspect 5: The method of any of aspects 2 through 4, wherein the first resource is scheduled during a first slot and the second resource is scheduled during a second slot that is consecutive with the first slot.

Aspect 6: The method of any of aspects 2 through 4, wherein the first resource is scheduled during a first slot and the second resource is scheduled during a second slot that is separated from the first slot by one or more slots.

Aspect 7: The method of any of aspects 2 through 6, further comprising: transmitting, to the second device and based at least in part on establishing the connection with the second device, a second message activating a mode associated with transmitting periodic reference signals, the reference signal and reference signals of the set of reference signals being of a same type as the periodic reference signals; and scheduling, based at least in part on a period associated with the periodic reference signals, the first resource for transmitting the first repetition of the set of reference signals and a third resource for transmitting a first repetition of a second set of reference signals, the third resource occurring after the second resource.

Aspect 8: The method of aspect 7, wherein the period comprises a first quantity of slots and a duration comprising the first resource and the second resource comprises a second quantity of slots that is smaller than the first quantity of slots.

Aspect 9: The method of any of aspects 2 through 6, further comprising: transmitting, to the second device and based at least in part on establishing the connection with the second device, a second message activating a mode associated with transmitting periodic reference signals, the reference signal and reference signals of the set of reference signals being of a same type as the periodic reference signals, wherein a duration between the first resource and the second resource is based at least in part on a period associated with the periodic reference signals.

Aspect 10: The method of any of aspects 1 through 9, further comprising: transmitting, to the second device, an indication of a quantity of the repetitions of the reference signal.

Aspect 11: The method of any of aspects 1 through 10, further comprising: determining, based at least in part on the information about the channel received from the second device, first characteristics of a direct path between the first device and the second device and second characteristics of an indirect path between the first device and the second device via a reconfigurable surface; and determining whether to use the direct path or the indirect path to communicate with the second device based at least in part on the first characteristics and the second characteristics.

Aspect 12: The method of any of aspects 1 through 11, wherein the reference signal is associated with a first beam, the method further comprising: transmitting, using a second beam, second repetitions of a second reference signal, wherein the message is received in response to transmitting the second repetitions of the second reference signal and comprises second information about a second channel between the first device and the second device that is associated with the second beam; and determining whether to use the beam or the second beam to communicate with the second device based at least in part on the message.

Aspect 13: The method of any of aspects 1 through 12, wherein the message comprises first information about a direct path between the first device and the second device, second information about a first indirect path between the first device and the second device via a reconfigurable surface, and third information about a second indirect path between the first device and the second device via a second reconfigurable surface.

Aspect 14: A method for wireless communication at a second device, comprising: establishing a connection with a first device; receiving a signal based at least in part on establishing the connection with the first device, the signal being based at least in part on repetitions of a reference signal transmitted from the first device; combining the signal with a modulation sequence associated with a reconfigurable surface to obtain a combined signal; and generating, for the reconfigurable surface and based at least in part on the combined signal, information about a channel between the first device and the second device.

Aspect 15: The method of aspect 14, wherein combining the signal with the modulation sequence comprises: applying a first modulation of the modulation sequence to a first portion of the signal associated with a first repetition of the repetitions of the reference signal and a second modulation of the modulation sequence to a second portion of the signal associated with a second repetition of the repetitions of the reference signal.

Aspect 16: The method of any of aspects 14 through 15, further comprising: combining the signal with a second modulation sequence associated with a second reconfigurable surface, wherein combining the signal with the second modulation sequence comprises applying a first modulation of the second modulation sequence to a first portion of the signal associated with a first repetition of the repetitions of the reference signal and a second modulation of the second modulation sequence to a second portion of the signal associated with a second repetition of the repetitions of the reference signal.

Aspect 17: The method of any of aspects 14 through 16, wherein the reference signal is associated with a beam of the first device, the method further comprising: generating, for the beam, first information about an indirect path between the first device and the second device via the reconfigurable surface based at least in part on combining the signal with the modulation sequence; generating, for the beam, second information about a direct path between the first device and the second device based at least in part on combining the signal with the modulation sequence; generating a report comprising the first information and the second information; and transmitting the report to the first device.

Aspect 18: The method of aspect 17, further comprising: generating third information about a second indirect path between the first device and the second device via a second reconfigurable surface based at least in part on combining the signal with a second modulation sequence associated with the second reconfigurable surface, wherein the report comprises the third information.

Aspect 19: The method of any of aspects 17 through 18, wherein the reference signal is associated with a beam of the first device, the method further comprising: receiving a second signal, the signal being based at least in part on repetitions of a second reference signal transmitted from the first device, and the second reference signal being associated with a second beam of the first device; combining the second signal with the modulation sequence associated with the reconfigurable surface to obtain a second combined signal; and generating, for the reconfigurable surface and based at least in part on the second combined signal, third information about a second channel between the first device and the second device that is associated with the second beam.

Aspect 20: The method of any of aspects 14 through 19, wherein the information comprises a measurement of average power, a measurement of a signal-to-noise ratio, a measurement of a signal-to-interference-plus-noise ratio, a channel quality indicator, a precoding matrix indicator, a rank indicator, or a channel state information-reference signal resource indicator.

Aspect 21: A method for wireless communication at a reconfigurable surface, comprising: obtaining, from a first device, repetitions of a reference signal; applying a modulation sequence to the repetitions of the reference signal to obtain a modulated signal, the modulation sequence being associated with the reconfigurable surface; and transmitting the modulated signal based at least in part on applying the modulation sequence.

Aspect 22: The method of aspect 21, wherein applying the modulation sequence to the repetitions of the reference signal comprises: applying a first modulation of the modulation sequence to a first repetition of the reference signal and a second modulation of the modulation sequence to a second repetition of the reference signal.

Aspect 23: The method of any of aspects 21 through 22, wherein applying the modulation sequence to the repetitions of the reference signal comprises: applying a phase modulation, an amplitude modulation, a polarization, or a spatial modulation to the repetitions of the reference signal.

Aspect 24: The method of any of aspects 21 through 23, further comprising: receiving an indication of a quantity of the repetitions of the reference signal.

Aspect 25: The method of any of aspects 21 through 24, further comprising: receiving an indication of a set of resources scheduled for transmission of the repetitions of the reference signal.

Aspect 26: The method of any of aspects 21 through 25, further comprising: receiving a message assigning a plurality of modulation sequences to the reconfigurable surface, wherein each modulation sequence of the plurality of modulation sequences is associated with the reconfigurable surface and an angle of reflection from the reconfigurable surface; and selecting the modulation sequence from the plurality of modulation sequences based at least in part on an angle of reflection configured at the reconfigurable surface.

Aspect 27: A method for wireless communication at a first device, comprising: scheduling, for a second device, a first reference signal resource and a second reference signal resource; transmitting a first reference signal using the first reference signal resource and a second reference signal using the second reference signal resource; receiving, from the second device and based at least in part on the first reference signal and the second reference signal, first information and second information about a channel between the first device and the second device, the first information being based at least in part on the first reference signal and the second information being based at least in part on the second reference signal; and determining a position of the second device relative to the reconfigurable surface based at least in part on the first information and the second information.

Aspect 28: The method of aspect 27, wherein determining the position of the second device comprises: comparing, based at least in part on the first information and the second information, a received signal power of the first reference signal with a received power of the second reference signal; and determining that the second device is in a first region associated with a direct path between the first device and the second device based at least in part on a difference between the first reference signal and the second reference signal being greater than a threshold.

Aspect 29: The method of any of aspects 27 through 28, wherein determining the position of the second device comprises: comparing, based at least in part on the first information and the second information, a received signal power of the first reference signal with a received power of the second reference signal; and determining that the second device is in a second region associated with an indirect path between the first device and the second device via the reconfigurable surface based at least in part on a difference between the first reference signal and the second reference signal being less than a threshold.

Aspect 30: The method of any of aspects 27 through 28, further comprising: configuring the reconfigurable surface to apply, to the first reference signal, a first modulation that reflects the first reference signal and, to the second reference signal, a second modulation that diffuses the second reference signal.

Aspect 31: An apparatus for wireless communication at a first device, comprising a processor; memory coupled with the processor; and instructions stored in the memory and executable by the processor to cause the apparatus to perform a method of any of aspects 1 through 13.

Aspect 32: An apparatus for wireless communication at a first device, comprising at least one means for performing a method of any of aspects 1 through 13.

Aspect 33: A non-transitory computer-readable medium storing code for wireless communication at a first device, the code comprising instructions executable by a processor to perform a method of any of aspects 1 through 13.

Aspect 34: An apparatus for wireless communication at a second device, comprising a processor; memory coupled with the processor; and instructions stored in the memory and executable by the processor to cause the apparatus to perform a method of any of aspects 14 through 20.

Aspect 35: An apparatus for wireless communication at a second device, comprising at least one means for performing a method of any of aspects 14 through 20.

Aspect 36: A non-transitory computer-readable medium storing code for wireless communication at a second device, the code comprising instructions executable by a processor to perform a method of any of aspects 14 through 20.

Aspect 37: An apparatus for wireless communication at a reconfigurable surface, comprising a processor; memory coupled with the processor; and instructions stored in the memory and executable by the processor to cause the apparatus to perform a method of any of aspects 21 through 26.

Aspect 38: An apparatus for wireless communication at a reconfigurable surface, comprising at least one means for performing a method of any of aspects 21 through 26.

Aspect 39: A non-transitory computer-readable medium storing code for wireless communication at a reconfigurable surface, the code comprising instructions executable by a processor to perform a method of any of aspects 21 through 26.

Aspect 40: An apparatus for wireless communication at a first device, comprising a processor; memory coupled with the processor; and instructions stored in the memory and executable by the processor to cause the apparatus to perform a method of any of aspects 27 through 30.

Aspect 41: An apparatus for wireless communication at a first device, comprising at least one means for performing a method of any of aspects 27 through 30.

Aspect 42: A non-transitory computer-readable medium storing code for wireless communication at a first device, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:

establishing a connection with a second device;

based at least in part on establishing the connection with the second device, transmitting repetitions of a reference signal, the repetitions of the reference signal being quasi-colocated with one another or sharing an antenna port, wherein the repetitions of the reference signal comprise N repetitions;

receiving, from the second device and in response to transmitting the repetitions of the reference signal, a message comprising information about a channel comprising a reflected path via one or more reconfigurable surfaces between the first device and the second device, wherein the message comprising information about the channel comprises a channel state information (CSI) report, wherein the information about the channel comprises a modulation sequence index corresponding to a modulation sequence comprising a series of modulations applied to reflections of the N repetitions of the reference signal by the reconfigurable surface, wherein the modulation sequence is unique to the reconfigurable surface or indicates a reflective state of the reconfigurable surface to distinguish between one or more direct and indirect paths to a receiving device;

determining, based at least in part on the CSI report, first characteristics of a direct path between the first device and the second device and second characteristics of an indirect path between the first device and the second device via the reconfigurable surface, the indirect path comprising the reflected path; and determining whether to use the direct path or the indirect path to communicate with the second device based at least in part on the modulation sequence index, the first characteristics, and the second characteristics; and communicating with the second device based at least in part on the message.

2. The method of claim 1, further comprising:
scheduling a first resource for transmitting a first repetition of a set of reference signals, the set of reference signals comprising the reference signal, and the first repetition of the set of reference signals comprising a first repetition of the reference signal; and
scheduling a second resource for transmitting a second repetition of the set of reference signals, the second repetition of the set of reference signals comprising a second repetition of the reference signal.

3. The method of claim 2, wherein transmitting the repetitions of the reference signal comprises:
transmitting the first repetition of the reference signal using the first resource and the second repetition of the reference signal using the second resource.

4. The method of claim 2, wherein each reference signal of the first repetition of the set of reference signals is quasi-colocated or shares a respective antenna port with a respective reference signal of the second repetition of the set of reference signals.

5. The method of claim 2, wherein the first resource is scheduled during a first slot and the second resource is scheduled during a second slot that is consecutive with the first slot.

6. The method of claim 2, wherein the first resource is scheduled during a first slot and the second resource is scheduled during a second slot that is separated from the first slot by one or more slots.

7. The method of claim 2, further comprising:
transmitting, to the second device and based at least in part on establishing the connection with the second device, a second message activating a mode associated with transmitting periodic reference signals, the reference signal and reference signals of the set of reference signals being of a same type as the periodic reference signals; and
scheduling, based at least in part on a period associated with the periodic reference signals, the first resource for transmitting the first repetition of the set of reference signals and a third resource for transmitting a first repetition of a second set of reference signals, the third resource occurring after the second resource.

8. The method of claim 7, wherein the period comprises a first quantity of slots and a duration comprising the first resource and the second resource comprises a second quantity of slots that is smaller than the first quantity of slots.

9. The method of claim 2, further comprising:
transmitting, to the second device and based at least in part on establishing the connection with the second device, a second message activating a mode associated with transmitting periodic reference signals, the reference signal and reference signals of the set of reference signals being of a same type as the periodic reference signals, wherein a duration between the first resource and the second resource is based at least in part on a period associated with the periodic reference signals.

10. The method of claim 1, further comprising:
transmitting, to the second device, an indication of a quantity of the repetitions of the reference signal.

11. The method of claim 1, wherein the reference signal is associated with a first beam, the method further comprising:
transmitting, using a second beam, second repetitions of a second reference signal, wherein the message is received further in response to transmitting the second repetitions of the second reference signal and further comprises second information about a second channel between the first device and the second device that is associated with the second beam; and
wherein determining whether to use the direct path or the indirect path comprise determining whether to use the first beam or the second beam to communicate with the second device based at least in part on the message.

12. The method of claim 1, the indirect path comprising a first indirect path, wherein the message comprises:
first information about the direct path between the first device and the second device,
second information about the first indirect path between the first device and the second device via the reconfigurable surface, the first indirect path comprising the reflected path, and
third information about a second indirect path between the first device and the second device via a second reconfigurable surface.

13. An apparatus for wireless communication at a first device, comprising:
memory; and
one or more processors, coupled to the memory, configured to cause the apparatus to:
establish a connection with a second device;
based at least in part on establishing the connection with the second device, transmit repetitions of a reference signal, the repetitions of the reference signal being quasi-colocated with one another or sharing an antenna port, wherein the repetitions of the reference signal comprise N repetitions;
receive, from the second device and in response to transmitting the repetitions of the reference signal, a message comprising information about a channel comprising a reflected path via one or more reconfigurable surfaces between the first device and the second device, wherein the message comprising information about the channel comprises a channel state information (CSI) report, wherein the information about the channel comprises a modulation sequence index corresponding to a modulation sequence comprising a series of modulations applied to reflections of the N repetitions of the reference signal by the reconfigurable surface, wherein the modulation sequence is unique to the reconfigurable surface or indicates a reflective state of the reconfigurable surface to distinguish between one or more direct and indirect paths to a receiving device;
determine, based at least in part on the CSI report, first characteristics of a direct path between the first device and the second device and second characteristics of an indirect path between the first device and the second device via the reconfigurable surface, the indirect path comprising the reflected path; and
determine whether to use the direct path or the indirect path to communicate with the second device based at least in part on the modulation sequence index, the first characteristics, and the second characteristics; and
communicate with the second device based at least in part on the message.

14. The apparatus of claim 13, wherein the one or more processors are further configured to cause the apparatus to:
schedule a first resource for transmitting a first repetition of a set of reference signals, the set of reference signals comprising the reference signal, and the first repetition of the set of reference signals comprising a first repetition of the reference signal; and schedule a second resource for transmitting a second repetition of the set of reference signals, the second repetition of the set of reference signals comprising a second repetition of the reference signal.

15. The apparatus of claim 14, wherein the one or more processors are configured to cause the apparatus to transmit the repetitions of the reference signal by:

transmitting the first repetition of the reference signal using the first resource and the second repetition of the reference signal using the second resource.

16. The apparatus of claim 14, wherein each reference signal of the first repetition of the set of reference signals is quasi-colocated or shares a respective antenna port with a respective reference signal of the second repetition of the set of reference signals.

17. The apparatus of claim 14, wherein the one or more processors are further configured to cause the apparatus to:

transmit, to the second device and based at least in part on establishing the connection with the second device, a second message activating a mode associated with transmitting periodic reference signals, the reference signal and reference signals of the set of reference signals being of a same type as the periodic reference signals; and schedule, based at least in part on a period associated with the periodic reference signals, the first resource for transmitting the first repetition of the set of reference signals and a third resource for transmitting a first repetition of a second set of reference signals, the third resource occurring after the second resource.

18. The apparatus of claim 14, wherein the one or more processors are further configured to cause the apparatus to:

transmit, to the second device and based at least in part on establishing the connection with the second device, a second message activating a mode associated with transmitting periodic reference signals, the reference signal and reference signals of the set of reference signals being of a same type as the periodic reference signals, wherein a duration between the first resource and the second resource is based at least in part on a period associated with the periodic reference signals.

19. The apparatus of claim 13, wherein the one or more processors are further configured to cause the apparatus to:

transmit, to the second device, an indication of a quantity of the repetitions of the reference signal.

* * * * *